(12) United States Patent
Ben-Dor et al.

(10) Patent No.: US 11,494,988 B2
(45) Date of Patent: Nov. 8, 2022

(54) METHOD AND SYSTEM FOR IMPLEMENTING AUGMENTED REALITY (AR)-BASED ASSISTANCE WITHIN WORK ENVIRONMENT

(71) Applicant: Agilent Technologies, Inc., Santa Clara, CA (US)

(72) Inventors: Amir Ben-Dor, Kfar-Saba (IL); Elad Arbel, Tel-Aviv (IL); Richard Workman, Sunnyvale, CA (US); Victor Lim, Pacifica, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 16/418,818

(22) Filed: May 21, 2019

(65) Prior Publication Data

US 2019/0362556 A1 Nov. 28, 2019

Related U.S. Application Data

(60) Provisional application No. 62/675,122, filed on May 22, 2018.

(51) Int. Cl.
*G06T 19/00* (2011.01)
*G06V 20/20* (2022.01)
(Continued)

(52) U.S. Cl.
CPC .......... *G06T 19/006* (2013.01); *G02B 27/017* (2013.01); *G06K 7/10396* (2013.01);
(Continued)

(58) Field of Classification Search
CPC .................................................. G06T 19/006
See application file for complete search history.

(56) References Cited

U.S. PATENT DOCUMENTS 5,794,789 A 8/1998 Payson et al.
5,998,751 A 12/1999 Brunelle
(Continued)

FOREIGN PATENT DOCUMENTS

CN 1287913 C 12/2006
CN 202909958 U 5/2013
(Continued)

OTHER PUBLICATIONS

"The Pathologist." 2018. Retrieved from www.hopkinsmedicine. org/health/treatment-tests-and-therapies/the-pathologist on Nov. 17, 2021. (Year: 2018).*
(Continued)

*Primary Examiner* — Ryan McCulley
(74) *Attorney, Agent, or Firm* — Mannava & Kang, P.C.; Adesh Bhargava

(57) ABSTRACT

Novel tools and techniques are provided for implementing augmented reality (AR)-based assistance within a work environment. In various embodiments, a computing system might receive, from a camera having a field of view of a work environment, first images of at least part of the work environment, the first images overlapping with a field of view of a user wearing an AR headset; might analyze the received first images to identify objects; might query a database(s) to determine a task associated with a first object(s) among the identified objects; might generate an image overlay providing at least one of graphical icon-based, text-based, image-based, and/or highlighting-based instruction(s) each indicative of instructions presented to the user to implement the task associated with the first object(s); and might display, to the user's eyes through the AR headset, the generated first image overlay that overlaps with the field of view of the user's eyes.

23 Claims, 9 Drawing Sheets

(51) Int. Cl.
  *G02B 27/01* (2006.01)
  *G06K 7/10* (2006.01)
  *G06K 7/14* (2006.01)
  *G06Q 10/06* (2012.01)

(52) U.S. Cl.
  CPC ....... *G06K 7/10881* (2013.01); *G06K 7/1408* (2013.01); *G06Q 10/06316* (2013.01); *G06V 20/20* (2022.01)

(56) References Cited

U.S. PATENT DOCUMENTS

| | | | |
|---|---|---|---|
| 6,243,620 B1 | 6/2001 | Robinson et al. | |
| 6,298,275 B1 | 10/2001 | Herman, Jr. | |
| 6,370,446 B1 | 4/2002 | Divine | |
| 6,580,962 B2 | 6/2003 | Rapoza et al. | |
| 6,685,031 B2 | 2/2004 | Takizawa | |
| 6,786,404 B1 | 9/2004 | Bonner et al. | |
| 6,847,481 B1 | 1/2005 | Ludl et al. | |
| 6,878,896 B2 | 4/2005 | Braginsky et al. | |
| 7,090,134 B2 | 8/2006 | Ramsager | |
| 7,221,276 B2 | 5/2007 | Olsen, III et al. | |
| 7,561,717 B2 | 7/2009 | Anderson | |
| 7,863,889 B1 | 1/2011 | Bamrungtham | |
| 8,260,455 B2 | 9/2012 | Redford et al. | |
| 8,676,509 B2 | 3/2014 | De La Torre-Bueno | |
| 8,712,118 B2 | 4/2014 | De La Torre-Bueno | |
| 8,825,200 B2 | 9/2014 | Carpenter et al. | |
| 8,863,961 B2 | 10/2014 | Carpenter et al. | |
| 8,947,456 B2 | 2/2015 | Chen et al. | |
| 9,233,401 B2 | 1/2016 | Miette et al. | |
| 9,321,083 B2 | 4/2016 | Volta et al. | |
| 9,646,369 B2 | 5/2017 | Salzman et al. | |
| 9,727,838 B2 | 8/2017 | Campbell | |
| 9,839,941 B2 | 12/2017 | Kincaid et al. | |
| 10,088,655 B2 | 10/2018 | Virk et al. | |
| 2003/0116481 A1 | 1/2003 | Takizawa | |
| 2004/0016684 A1 | 1/2004 | Braginsky et al. | |
| 2005/0149226 A1 | 7/2005 | Stevens et al. | |
| 2007/0073585 A1 | 3/2007 | Apple et al. | |
| 2008/0239478 A1 | 3/2008 | Tafas et al. | |
| 2010/0318215 A1 | 6/2010 | Bentele et al. | |
| 2012/0056717 A1 | 3/2012 | Maharbiz et al. | |
| 2013/0038633 A1* | 2/2013 | Maggiore | B01D 65/104 345/633 |
| 2013/0293468 A1 | 11/2013 | Perez et al. | |
| 2014/0200618 A1 | 3/2014 | Donner et al. | |
| 2014/0168056 A1 | 6/2014 | Swaminathan et al. | |
| 2015/0325047 A1 | 11/2015 | Conner et al. | |
| 2016/0035224 A1* | 2/2016 | Yang | G08G 5/0078 701/23 |
| 2016/0139387 A1 | 5/2016 | Virk et al. | |
| 2017/0038912 A1 | 2/2017 | Nishida et al. | |
| 2017/0301105 A1 | 10/2017 | Workman et al. | |
| 2018/0247024 A1* | 8/2018 | Divine | G16H 20/40 |
| 2018/0365898 A1* | 12/2018 | Costa | G06F 3/038 |
| 2019/0362556 A1 | 11/2019 | Ben-Dor et al. | |
| 2020/0272224 A1* | 8/2020 | Scarabelli | G06T 19/006 |

FOREIGN PATENT DOCUMENTS

| | | |
|---|---|---|
| CN | 103144802 A | 6/2013 |
| EP | 0928641 A1 | 1/1999 |
| EP | 0928641 A1 | 7/1999 |
| WO | WO-2004-009257 A1 | 1/2004 |
| WO | WO-2013-170204 A1 | 11/2013 |
| WO | WO-2014-200618 A1 | 12/2014 |
| WO | WO 2019-226688 A1 | 11/2019 |

OTHER PUBLICATIONS

May 21, 2019 PCT Application filed, as PCT//US19/033375, 102 pages.
International Search Report, International Application No. PCT/US2014/034045, dated Aug. 27, 2014, 10 pages.
Extended European Search Report, Application No. 14811005.9 dated Jan. 5, 2017, 5 pages.
Chinese Office Action, Application No. 201480033762.X, dated Dec. 7, 2017, 8 pages.
European Office Action, Application No. 14811005.9, dated Dec. 4, 2017, 3 pages.
Chinese Office Action, Application No. 201480033762.X, dated Jul. 9, 2018, 7 pages.
Office Action, U.S. Appl. No. 15/800,995, dated Jul. 12, 2018, 12 pages.
International Search Report & Written Opinion, International Application No. PCT//US19/033375, dated Aug. 27, 2019, 16 pages.
International PCT Application No. PCT/US19/33375 International Preliminary Report on Patentability, dated Dec. 3, 2020, 10 pages.
U.S. Appl. No. 15/424,700, Non-Final Office Action dated Jun. 4, 2018, 23 pages.
U.S. Appl. No. 15/424,700, Notice of Allowance, dated Oct. 5, 2018, 8 pages.

* cited by examiner

METHOD AND SYSTEM FOR IMPLEMENTING AUGMENTED REALITY (AR)-BASED ASSISTANCE WITHIN WORK ENVIRONMENT

CROSS-REFERENCES TO RELATED APPLICATIONS

This application claims priority to U.S. Patent Application Ser. No. 62/675,122 (the "'122 Application"), filed May 22, 2018 by Amir Ben-Dor et al., entitled, "Method and Apparatus for Facilitating Manual Sorting of Objects," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing assistance within a work environment, and, more particularly, to methods, systems, and apparatuses for implementing augmented reality (AR)-based assistance within a work environment.

BACKGROUND

In conventional work environments, such as in cases where tasks involve working with a large number of objects—particularly where such objects are difficult to distinguish from other similar objects at a glance—or where automation is difficult to implement due to fragility of such objects and/or due to many different tasks being required (thus making automation expensive or cumbersome to implement), user performance of the tasks (such as by hand or using hand tools) can result in inefficiencies or inaccuracies in the performance of the tasks.

For example, tasks involving hand sorting of objects, which may be required in a number of areas of technology, might include hand sorting of tissue samples that are stained and mounted on microscope slides for viewing by pathologists in pathology laboratories. The tissue samples may be sorted into containers that are sent to the pathologists who requested those stained samples. The number of slides processed in this manner in a day at a large medical facility can be in the thousands, serving many pathologists, and hence, it would be advantageous to provide an automated sorting system. Unfortunately, the slides are usually irreplaceable because the patient is no longer in the medical facility or the tissue from which the slides were made is no longer available. Accordingly, the slides have to be sorted by hand into the containers to avoid damage.

If the volume of objects that need to be sorted is small, providing an automated solution presents challenges, because the cost of the machinery cannot be recouped. Similarly, if the objects are small, fragile, or of a number of different shapes, the cost of fully automated sorting machinery becomes prohibitive. In addition, automated systems tend to require dedicated floor or desk space. In applications in which the system is used only occasionally, the cost of setting up the system and then taking it down can be prohibitive. Finally, if the volume of sorting varies significantly from day to day, on some days, it may be necessary to use multiple technicians for the sorting. However, if the sorting apparatus requires a fixed setup, increasing the capacity by adding personnel presents challenges.

Conventional systems that could be used to sort these systems or to assist a user in the hand sorting of the slides may require a physical super structure to hold its components in place. Hence, the system is not easily moved, nor is it well suited for simultaneous or concurrent use by multiple technicians.

Hence, there is a need for more robust and scalable solutions for implementing assistance within a work environment, and, more particularly, to methods, systems, and apparatuses for implementing augmented reality (AR)-based assistance within a work environment.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
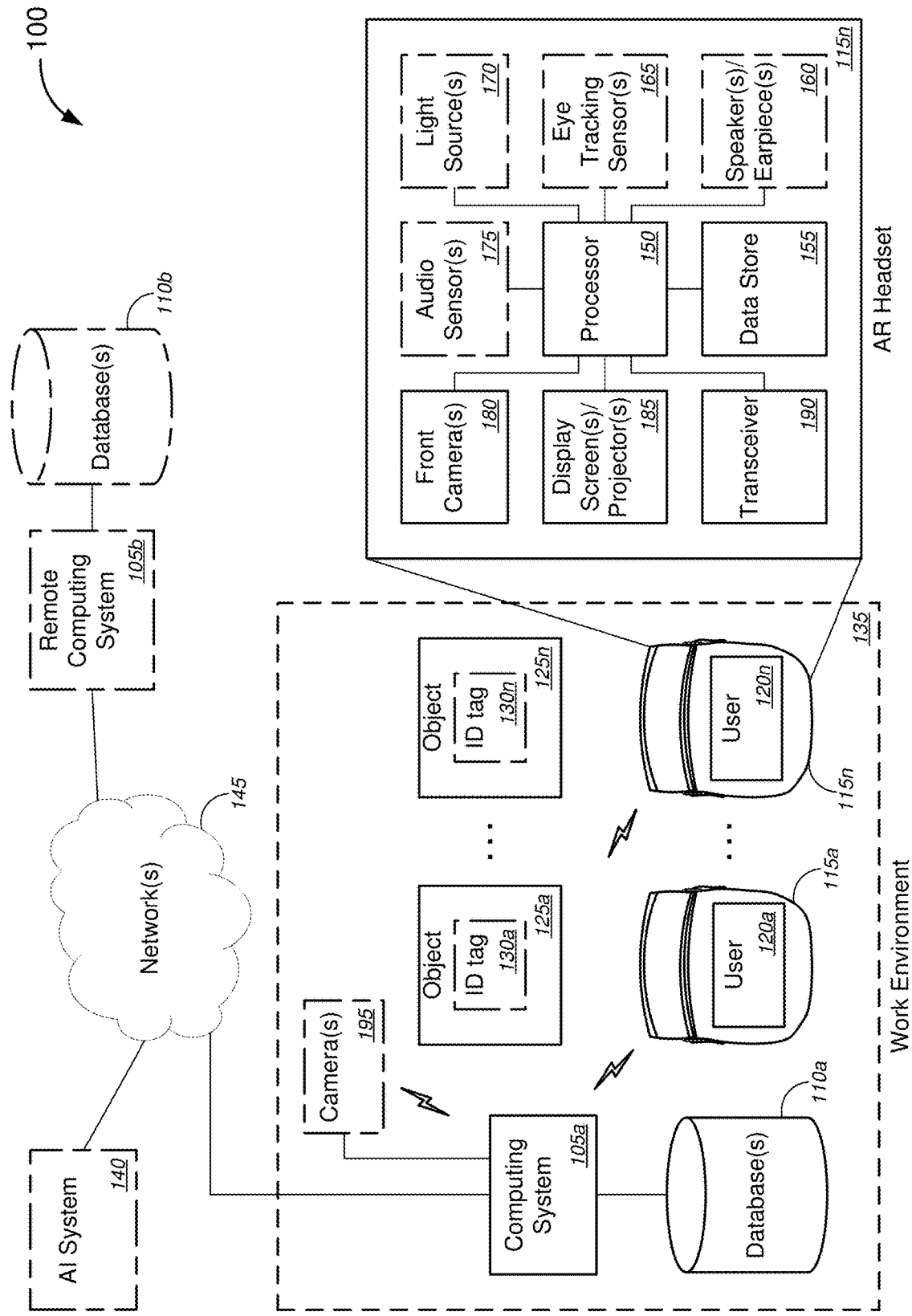
FIG. 1 is a schematic diagram illustrating a system for implementing augmented reality (AR)-based assistance within a work environment, in accordance with various embodiments.

Various embodiments provide tools and techniques for implementing assistance within a work environment, and, more particularly, to methods, systems, and apparatuses for implementing augmented reality (AR)-based assistance within a work environment.

In various embodiments, a computing system might receive, from one or more first image capture devices having a field of view of at least a first portion of a work environment (i.e., directed in front of an AR headset worn by a first user), one or more first images of the at least a first portion of the work environment, the one or more first images overlapping with a field of view of eyes of the first user wearing the AR headset. The computing system might analyze the received one or more first images to identify one or more first objects disposed in the work environment; might query at least one database to determine a first task associated with at least one first object among the identified one or more first objects; might generate a first image overlay, the first image overlay providing one or more instructions (which might include, without limitation, at least one of a graphical icon-based instruction, a text-based instruction, an image-based instruction, or a highlighting-based instruction, and/or the like) to be presented to a user to implement the first task associated with the at least one first object; and might display, to the eyes of the first user through the AR headset, the generated first image overlay that overlaps with the field of view of the eyes of the first user.

According to some embodiments, the computing system might include, without limitation, one of a processor disposed in the AR headset, a computing system disposed in the work environment, a remote computing system disposed external to the work environment and accessible over a network, or a cloud computing system, and/or the like. In some cases, the AR headset might include, but is not limited to, one of a set of AR goggles, a pair of AR-enabled eyewear, an AR-enabled smartphone mounted in a headset, or an AR helmet, and/or the like. In some instances, at least one of the one or more first image capture devices might be disposed on a portion of a housing of the AR headset.

In some instances, the at least one of the graphical icon-based instruction, the text-based instruction, the image-based instruction, or the highlighting-based instruction might include, but is not limited to, at least one of a graphical icon-based instruction, a text-based instruction, an image-based instruction, or a highlighting-based instruction that, when displayed within the generated first image overlay, is superimposed over, displayed around, or displayed beside the at least one first object as viewed by the user through the AR headset, and/or the like. In some cases, the graphical icon-based instruction might include, without limitation, at least one of a graphical icon representing identification information associated with the at least one first object; a graphical icon representing identification information associated with a second object with which the at least one first object is intended to interact as part of the first task; a colored graphical icon distinguishing one first object from another first object among the at least one first object; a graphical icon comprising a directional arrow representing a direction that the at least one first object should be taken as part of the first task; or a colored graphical icon comprising a colored directional arrow distinguishing a first direction that the at least one first object should be taken as part of the first task from a second direction that a third object should be taken as part of the first task, and/or the like. In some instances, the text-based instruction might include, but is not limited to, at least one of a floating text window comprising textual instructions corresponding to the first task; or a surface text window that is superimposed on one of a table-top surface, a wall surface, or an object surface and that comprises textual instructions corresponding to the first task. In some cases, the floating text window, when displayed within the generated first image overlay, is displayed as a floating image beside the at least one first object or displayed as a floating image within the field of view of the eyes of the first user.

In some instances, the image-based instruction might include, without limitation, at least one of an image representing identification information associated with the at least one first object; an image representing identification information associated with a second object with which the at least one first object is intended to interact as part of the first task; an image comprising a directional arrow representing a direction that the at least one first object should be taken as part of the first task; an image comprising images of numbers or codes representing an order of processes of the first task associated with the at least one first object; a magnified image of the at least one first object; a three-dimensional ("3D") image or hologram; or an image of the at least one first object superimposed over a targeted portion of the work environment indicating at least one of position, orientation, or configuration of the at least one first object intended for placement at the targeted portion; and/or the like. In some cases, the highlighting-based instruction might include, but is not limited to, at least one of a highlighting field that, when displayed within the generated first image overlay, is superimposed over the at least one first object; a highlighting field that, when displayed within the generated first image overlay, is superimposed over a fourth object that is related to the first task associated with the at least one first object; or a highlighting field that, when displayed within the generated first image overlay, is superimposed over a targeted portion of the work environment indicated intended placement of the at least one first object at the targeted portion; and/or the like.

In some embodiments, the first task might include, without limitation, sorting, categorizing, arranging, or organizing the one or more first objects, wherein the one or more objects might include, but is not limited to, one or more microscope slides each containing a test sample or a tissue sample. In some cases, a plurality of users are tasked with performing the first task, wherein each user wears an AR headset that displays generated image overlays to each user that distinguishes objects that one user is intended to interact with from objects that the other users among the plurality of users are intended to interact with as part of the first task. Alternatively, the first task might include, without limitation, one of running a test sample or a tissue sample using laboratory instrumentation; assembling a piece of machinery; assembling an object; preparing a test sample or a tissue sample; identifying or tracking samples within a laboratory; instructing or guiding users regarding how to perform experimental protocols or tests in a laboratory; performing processes in a histology laboratory; performing processes in a pathologist's office; performing tasks after slide diagnosis; performing processes in a clinical or analytical laboratory; or transferring reagents or samples; and/or the like. In some cases, the one or more first objects might include, but is not limited to, one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like. In some cases, the work environment comprises one of a laboratory, a construction site, a machine shop, a workshop, a factory, or a room, and/or the like.

In accordance with the various embodiments described herein, the augmented reality ("AR") system provides for generation of image overlays (including, but not limited to, at least one of graphical icon-based overlays, text-based overlays, image-based overlays, or highlighting-based overlays, and/or the like) that are superimposed over either an actual view of an area (e.g., work environment or the like) or an image or video of the area. In the former case, the actual view of the area might be viewed by the user through a lens, visor, transparent screen, or the like, with the generated image overlays either being projected directly into the eyes of the user, being projected on a projection plane or surface in front of the eyes of the user (e.g., on the plane or surface defined by the lens, visor, transparent screen, or the like), or being displayed on the surface of the lens, visor, or transparent screen, or the like. Alternatively, for AR headsets without a lens, visor, transparent screen, or other component disposed between the eyes of the user (or the user's personal corrective lenses), the actual view of the area might be viewed directly by the eyes of the user (or through only the user's personal corrective lenses), with the generated image overlays either being projected directly into the eyes of the user or being projected as a hologram in front of the eyes of the user, or the like. In the latter case, the image or video of the area might be viewed by the user using a display screen disposed in front of the user, with the generated image overlays being superimposed over the image or video of the area prior to the composite image or video being displayed on the display screen. The use of AR headsets provides portability and flexibility within the work environment, among other advantages that overcome the issues inherent with the conventional techniques (such as the conventional hand sorting scenarios discussed above).

These and other aspects of the AR-based assistance system and functionality are described in greater detail with respect to the figures. In some aspects, the AR-based assistance system and functionality may also be integrated with a smart lab, content management, or lab workflow management systems, such as, but not limited to, Agilent OpenLab® or other similar software suite, or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, user assistance technology, and/or the like. In other aspects, certain embodiments, can improve the functioning of user equipment or systems themselves (e.g., user assistance systems, computing systems, etc.), for example, by receiving, with a computing system and from one or more first image capture devices having a field of view of at least a first portion of a work environment, one or more first images of the at least a first portion of the work environment, the one or more first images overlapping with a field of view of eyes of a first user wearing an augmented reality ("AR") headset; analyzing, with the computing system, the received one or more first images to identify one or more first objects disposed in the work environment; querying at least one database, with the computing system, to determine a first task associated with at least one first object among the identified one or more first objects; generating, with the computing system, a first image overlay, the first image overlay providing one or more instructions (which might include, without limitation, at least one of a graphical icon-based instruction, a text-based instruction, an image-based instruction, or a highlighting-based instruction, and/or the like) to be presented to a user to implement the first task associated with the at least one first object; and displaying, with the computing system and to the eyes of the first user through the AR headset, the generated first image overlay that overlaps with the field of view of the eyes of the first user; and/or the like. In particular, to the extent any abstract concepts are present in the various embodiments, those concepts can be implemented as described herein by devices, software, systems, and methods that involve specific novel functionality (e.g., steps or operations), such as, generating, with the augmented reality ("AR") system, image overlays (including, but not limited to, at least one of graphical icon-based overlays, text-based overlays, image-based overlays, or highlighting-based overlays, and/or the like) that are superimposed over either an actual view of an area (e.g., work environment or the like) or an image or video of the area, the generated image overlays providing at least one of a graphical icon-based instruction, a text-based instruction, an image-based instruction, or a highlighting-based instruction each indicative of one or more instructions to be presented to a user to implement the first task associated with the at least one first object, and/or the like, to name a few examples, that extend beyond mere conventional computer processing operations. These functionalities can produce tangible results outside of the implementing computer system, including, merely by way of example, optimized presentation of instructions within an AR environment to assist a user in the performance of tasks within a work environment, and/or the like, at least some of which may be observed or measured by customers and/or service providers.

In an aspect, a method might comprise receiving, with a computing system and from one or more first image capture devices having a field of view of at least a first portion of a work environment, one or more first images of the at least a first portion of the work environment, the one or more first images overlapping with a field of view of eyes of a first user wearing an augmented reality ("AR") headset; analyzing, with the computing system, the received one or more first images to identify one or more first objects disposed in the work environment; and querying at least one database, with the computing system, to determine a first task associated with at least one first object among the identified one or more first objects, wherein the first task comprises sorting, categorizing, arranging, or organizing the one or more first objects, wherein the one or more objects comprise one or more microscope slides each containing a test sample or a tissue sample. The method might further comprise generating, with the computing system, a first image overlay, the first image overlay providing at least one of a graphical icon-based instruction, a text-based instruction, an image-based instruction, or a highlighting-based instruction each indicative of one or more instructions to be presented to a user to implement the sorting, categorizing, arranging, or organizing of the one or more microscope slides containing test or tissue samples; and displaying, with the computing system and to the eyes of the first user through the AR headset, the generated first image overlay that overlaps with the field of view of the eyes of the first user.

In another aspect, a method might comprise receiving, with a computing system and from one or more first image capture devices having a field of view of at least a first portion of a work environment, one or more first images of the at least a first portion of the work environment, the one or more first images overlapping with a field of view of eyes of a first user wearing an augmented reality ("AR") headset; analyzing, with the computing system, the received one or more first images to identify one or more first objects disposed in the work environment; and querying at least one database, with the computing system, to determine a first task associated with at least one first object among the identified one or more first objects. The method might further comprise generating, with the computing system, a first image overlay, the first image overlay providing one or more instructions to be presented to a user to implement the first task associated with the at least one first object; and displaying, with the computing system and to the eyes of the first user through the AR headset, the generated first image overlay that overlaps with the field of view of the eyes of the first user.

In some embodiments, the computing system might comprise one of a processor disposed in the AR headset, a computing system disposed in the work environment, a remote computing system disposed external to the work environment and accessible over a network, or a cloud computing system, and/or the like. In some cases, the AR headset might comprise one of a set of AR goggles, a pair of AR-enabled eyewear, an AR-enabled smartphone mounted in a headset, or an AR helmet, and/or the like.

According to some embodiments, the AR headset might comprise one or more of at least one earpiece or at least one speaker, where the method might further comprise: generating, with the computing system, one or more audio-based instructions corresponding to each of at least one of the one or more instructions to be presented to the user via the generated first image overlay; and presenting, with the computing system and via one of the one or more of the at least one earpiece or the at least one speaker, the generated one or more audio-based instructions in conjunction with displaying corresponding each of at least one of the one or more instructions being presented to the user via the generated first image overlay as displayed to the eyes of the first user through the AR headset.

In some cases, displaying the generated first image overlay to the eyes of the first user through the AR headset comprises one of projecting the generated first image overlay directly in the eyes of the first user, projecting the generated first image overlay on a projection plane or surface in front of the eyes of the first user, projecting the generated first image overlay as a hologram in front of the eyes of the first user, displaying the generated first image overlay on a transparent or semi-transparent display screen of the AR headset that is disposed in front of the eyes of the first user, or displaying the generated first image overlay superimposed over a continuous video recording and display on a display screen of an AR-enabled smartphone mounted in the AR headset, and/or the like.

In some instances, at least one of the one or more first image capture devices might be disposed on a portion of a housing of the AR headset. According to some embodiments, the method might further comprise receiving, with the computing system and from one or more second image capture devices that are disposed within the work environment but external to the AR headset, one or more second images of at least a second portion of the work environment. In such cases, analyzing, with the computing system, the received one or more first images to identify one or more first objects disposed in the work environment might comprise analyzing, with the computing system, the received one or more first images and the received one or more second images to identify the one or more first objects disposed in the work environment.

In some embodiments, at least one of the one or more instructions, when displayed within the generated first image overlay, is superimposed over, displayed around, or displayed beside the at least one first object as viewed by the user through the AR headset. In some instances, the at least one of the one or more instructions might comprise at least one of a graphical icon-based instruction, a text-based instruction, an image-based instruction, or a highlighting-based instruction, and/or the like. In some cases, the graphical icon-based instruction might comprise at least one of a graphical icon representing identification information associated with the at least one first object, a graphical icon representing identification information associated with a second object with which the at least one first object is intended to interact as part of the first task, a colored graphical icon distinguishing one first object from another first object among the at least one first object, a graphical icon comprising a directional arrow representing a direction that the at least one first object should be taken as part of the first task, or a colored graphical icon comprising a colored directional arrow distinguishing a first direction that the at least one first object should be taken as part of the first task from a second direction that a third object should be taken as part of the first task, and/or the like. In some instances, the text-based instruction might comprise at least one of a floating text window comprising textual instructions corresponding to the first task or a surface text window that is superimposed on one of a table-top surface, a wall surface, or an object surface and that comprises textual instructions corresponding to the first task, wherein the floating text window, when displayed within the generated first image overlay, is displayed as a floating image beside the at least one first object or displayed as a floating image within the field of view of the eyes of the first user. In some cases, the image-based instruction might comprise at least one of an image representing identification information associated with the at least one first object, an image representing identification information associated with a second object with which the at least one first object is intended to interact as part of the first task, an image comprising a directional arrow representing a direction that the at least one first object should be taken as part of the first task, an image comprising images of numbers or codes representing an order of processes of the first task associated with the at least one first object, a magnified image of the at least one first object, a three-dimensional ("3D") image or hologram, or an image of the at least one first object superimposed over a targeted portion of the work environment indicating at least one of position, orientation, or configuration of the at least one first object intended for placement at the targeted portion, and/or the like. In some instances, the highlighting-based instruction might comprise at least one of a highlighting field that, when displayed within the generated first image overlay, is superimposed over the at least one first object, a highlighting field that, when displayed within the generated first image overlay, is superimposed over a fourth object that is related to the first task associated with the at least one first object, or a highlighting field that, when displayed within the generated first image overlay, is superimposed over a targeted portion of the work environment indicated intended placement of the at least one first object at the targeted portion, and/or the like.

According to some embodiments, the one or more first objects each might comprise a unique identifier, wherein the unique identifier comprises a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the first object itself or of a representative example of the first object (e.g., digital image of at least a portion of a tissue sample or tissue section, table, tray, container, instrumentation, tool, or other object, etc.), or a unique identifying feature or attribute (of a first object among the one or more first objects, or the like), and/or the like, wherein analyzing, with the computing system, the received one or more first images to identify one or more first objects disposed in the work environment might comprise identifying, with the computing system, a unique identifier that is associated with each of the one or more first objects and that is displayed on at least a portion of each of the one or more first objects. Merely by way of example, in some cases, the one or more first objects each might comprise a radio frequency identifier ("RFID") tag affixed thereto, wherein identifying the one or more first objects might comprise identifying the one or more first objects based on the RFID tag affixed to each first object in conjunction with identifying the one or more first objects based on analysis of the received one or more first images.

In some instances, the method might further comprise illuminating, with a first light source, one or more of the at least one first object or the at least a first portion of the work environment during at least one of the following periods: prior to the one or more first images being captured by the one or more first image capture device; or in conjunction with the display of the generated first image overlay. In some cases, the first light source might be disposed on a portion of the AR headset.

In some embodiments, the method might further comprise tracking, with the computing system and using one or more second image capture devices that are disposed on the AR headset and that have a field of view that includes the eyes of the first user, the eyes of the first user to determine a direction in which the first user is looking; and determining, with the computing system, a central portion of a field of view of the first user based at least in part on the determined direction that the first user is looking in conjunction with the one or more first images as captured by the one or more first image capture devices. In some instances, the method might further comprise, in response to determining the central portion of the field of view of the first user, identifying, with the computing system, at least one fifth object.

According to some embodiments, the first task might comprise sorting, categorizing, arranging, or organizing the one or more first objects, wherein the one or more objects might comprise one or more microscope slides each containing a test sample or a tissue sample. Alternatively, the first task might comprise one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like, wherein the one or more first objects might comprise one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like. In some cases, a plurality of users may be tasked with performing the first task, wherein each user might wear an AR headset that displays generated image overlays to each user that distinguishes objects that one user is intended to interact with from objects that the other users among the plurality of users are intended to interact with as part of the first task. In some instances, the work environment might comprise one of a laboratory, a construction site, a machine shop, a workshop, a factory, or a room, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from one or more first image capture devices having a field of view of at least a first portion of a work environment, one or more first images of the at least a first portion of the work environment, the one or more first images overlapping with a field of view of eyes of a first user wearing an augmented reality ("AR") headset; analyze the received one or more first images to identify one or more first objects disposed in the work environment; query at least one database to determine a first task associated with at least one first object among the identified one or more first objects; generate a first image overlay, the first image overlay providing one or more instructions to be presented to a user to implement the first task associated with the at least one first object; and display, to the eyes of the first user through the AR headset, the generated first image overlay that overlaps with the field of view of the eyes of the first user.

In some embodiments, the computing system might comprise one of a processor disposed in the AR headset, a computing system disposed in the work environment, a remote computing system disposed external to the work environment and accessible over a network, or a cloud computing system, and/or the like. In some cases, the AR headset might comprise one of a set of AR goggles, a pair of AR-enabled eyewear, an AR-enabled smartphone mounted in a headset, or an AR helmet, and/or the like.

According to some embodiments, the AR headset might comprise one or more of at least one earpiece or at least one speaker, where the first set of instructions, when executed by the at least one first processor, might further cause the computing system to: generate one or more audio-based instructions corresponding to each of at least one of the one or more instructions to be presented to the user via the generated first image overlay; and present, via one of the one or more of the at least one earpiece or the at least one speaker, the generated one or more audio-based instructions in conjunction with displaying corresponding each of at least one of the one or more instructions being presented to the user via the generated first image overlay as displayed to the eyes of the first user through the AR headset.

In some cases, displaying the generated first image overlay to the eyes of the first user through the AR headset comprises one of projecting the generated first image overlay directly in the eyes of the first user, projecting the generated first image overlay on a projection plane or surface in front of the eyes of the first user, projecting the generated first image overlay as a hologram in front of the eyes of the first user, displaying the generated first image overlay on a transparent or semi-transparent display screen of the AR headset that is disposed in front of the eyes of the first user, or displaying the generated first image overlay superimposed over a continuous video recording and display on a display screen of an AR-enabled smartphone mounted in the AR headset, and/or the like.

In some instances, at least one of the one or more first image capture devices might be disposed on a portion of a housing of the AR headset. According to some embodiments, the first set of instructions, when executed by the at least one first processor, might further cause the computing system to: receive, from one or more second image capture devices that are disposed within the work environment but external to the AR headset, one or more second images of at least a second portion of the work environment. In such cases, analyzing the received one or more first images to identify one or more first objects disposed in the work environment might comprise analyzing the received one or more first images and the received one or more second images to identify the one or more first objects disposed in the work environment.

In some embodiments, at least one of the one or more instructions, when displayed within the generated first image overlay, is superimposed over, displayed around, or displayed beside the at least one first object as viewed by the user through the AR headset. In some instances, the at least one of the one or more instructions might comprise at least one of a graphical icon-based instruction, a text-based instruction, an image-based instruction, or a highlighting-based instruction, and/or the like. In some cases, the graphical icon-based instruction might comprise at least one of a graphical icon representing identification information associated with the at least one first object, a graphical icon representing identification information associated with a second object with which the at least one first object is intended to interact as part of the first task, a colored graphical icon distinguishing one first object from another first object among the at least one first object, a graphical icon comprising a directional arrow representing a direction that the at least one first object should be taken as part of the first task, or a colored graphical icon comprising a colored directional arrow distinguishing a first direction that the at least one first object should be taken as part of the first task from a second direction that a third object should be taken as part of the first task, and/or the like. In some instances, the text-based instruction might comprise at least one of a floating text window comprising textual instructions corresponding to the first task or a surface text window that is superimposed on one of a table-top surface, a wall surface, or an object surface and that comprises textual instructions corresponding to the first task, wherein the floating text window, when displayed within the generated first image overlay, is displayed as a floating image beside the at least one first object or displayed as a floating image within the field of view of the eyes of the first user. In some cases, the image-based instruction might comprise at least one of an image representing identification information associated with the at least one first object, an image representing identification information associated with a second object with which the at least one first object is intended to interact as part of the first task, an image comprising a directional arrow representing a direction that the at least one first object should be taken as part of the first task, an image comprising images of numbers or codes representing an order of processes of the first task associated with the at least one first object, a magnified image of the at least one first object, a three-dimensional ("3D") image or hologram, or an image of the at least one first object superimposed over a targeted portion of the work environment indicating at least one of position, orientation, or configuration of the at least one first object intended for placement at the targeted portion, and/or the like. In some instances, the highlighting-based instruction might comprise at least one of a highlighting field that, when displayed within the generated first image overlay, is superimposed over the at least one first object, a highlighting field that, when displayed within the generated first image overlay, is superimposed over a fourth object that is related to the first task associated with the at least one first object, or a highlighting field that, when displayed within the generated first image overlay, is superimposed over a targeted portion of the work environment indicated intended placement of the at least one first object at the targeted portion, and/or the like.

According to some embodiments, the one or more first objects each might comprise a unique identifier, wherein the unique identifier comprises a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the first object itself or of a representative example of the first object (e.g., digital image of at least a portion of a tissue sample or tissue section, table, tray, container, instrumentation, tool, or other object, etc.), or a unique identifying feature or attribute (of a first object among the one or more first objects, or the like), and/or the like, wherein analyzing the received one or more first images to identify one or more first objects disposed in the work environment might comprise identifying a unique identifier that is associated with each of the one or more first objects and that is displayed on at least a portion of each of the one or more first objects. Merely by way of example, in some cases, the one or more first objects each might comprise a radio frequency identifier ("RFID") tag affixed thereto, wherein identifying the one or more first objects might comprise identifying the one or more first objects based on the RFID tag affixed to each first object in conjunction with identifying the one or more first objects based on analysis of the received one or more first images.

In some instances, the system might further comprise a first light source, which might illuminate one or more of the at least one first object or the at least a first portion of the work environment during at least one of the following periods: prior to the one or more first images being captured by the one or more first image capture device; or in conjunction with the display of the generated first image overlay. In some cases, the first light source might be disposed on a portion of the AR headset.

In some embodiments, the first set of instructions, when executed by the at least one first processor, might further cause the computing system to: track, using one or more second image capture devices that are disposed on the AR headset and that have a field of view that includes the eyes of the first user, the eyes of the first user to determine a direction in which the first user is looking; and determine a central portion of a field of view of the first user based at least in part on the determined direction that the first user is looking in conjunction with the one or more first images as captured by the one or more first image capture devices. In some instances, the first set of instructions, when executed by the at least one first processor, might further cause the computing system to: in response to determining the central portion of the field of view of the first user, identify at least one fifth object.

According to some embodiments, the first task might comprise sorting, categorizing, arranging, or organizing the one or more first objects, wherein the one or more objects might comprise one or more microscope slides each containing a test sample or a tissue sample. Alternatively, the first task might comprise one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like, wherein the one or more first objects might comprise one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like. In some cases, a plurality of users may be tasked with performing the first task, wherein each user might wear an AR headset that displays generated image overlays to each user that distinguishes objects that one user is intended to interact with from objects that the other users among the plurality of users are intended to interact with as part of the first task. In some instances, the work environment might comprise one of a laboratory, a construction site, a machine shop, a workshop, a factory, or a room, and/or the like.

In still another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from one or more first image capture devices having a field of view of at least a first portion of a work environment, one or more first images of the at least a first portion of the work environment, the one or more first images overlapping with a field of view of eyes of a first user wearing an augmented reality ("AR") headset; analyze the received one or more first images to identify one or more first objects disposed in the work environment; query at least one database to determine a first task associated with at least one first object among the identified one or more first objects; generate a first image overlay, the first image overlay providing one or more instructions to be presented to a user to implement the first task associated with the at least one first object; and display, to the eyes of the first user through the AR headset, the generated first image overlay that overlaps with the field of view of the eyes of the first user.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing assistance within a work environment, and, more particularly, to methods, systems, and apparatuses for implementing augmented reality (AR)-based assistance within a work environment, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing augmented reality (AR)-based assistance within a work environment, in accordance with various embodiments.

In the non-limiting embodiment of FIG. 1, system 100 might comprise computing system 105a and corresponding database(s) 110a. In some instances, the database(s) 110a might be local to the computing system 105a, in some cases, integrated within the computing system 105a. In other cases, the database 110a might be external, yet communicatively coupled, to the computing system 105a. System 100, according to some embodiments, might further comprise one or more augmented reality ("AR") headsets 115a-115n (collectively, "AR headsets 115" or the like) that are worn or wearable by one or more users 120a-120n (collectively, "users 120" or the like). In some cases, the AR headset might include, but is not limited to, one of a set of AR goggles, a pair of AR-enabled eyewear, an AR-enabled smartphone mounted in a headset, or an AR helmet, and/or the like. In some embodiments, system 100 might comprise one or more objects 125a-125n (collectively, "objects 125" or the like); in some cases, objects 125 might comprise identifier or identification ("ID") tags 130 (optional) affixed thereto (the ID tags 130 comprising tags 130a-130n, or the like, each affixed to one of the objects 125). In some instances, the ID tags 130 might comprise a unique identifier, which might include, without limitation, a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the object 125 itself or of a representative example of the object 125 (e.g., digital image of at least a portion of a tissue sample or tissue section, table, tray, container, instrumentation, tool, or other object, etc.), or a unique identifying feature or attribute (of an object among the one or more objects 125, or the like), and/or the like. Alternatively, or additionally, at least one of the ID tags 130 might comprise a radio frequency identifier ("RFID") tag, or the like, that when interrogated by a radio frequency scanner (which may be disposed in the AR headset 115, such as transceiver 190 or other component (not shown), or may be disposed within a dedicated RFID scanner or other similar device (not shown)) would broadcast identification information (which might include the unique identifier data, or the like) in rf response signals. [This describes a passive RFID tag, although a battery-assisted passive RFID tag may be used. An active RFID tag that broadcasts its data without need of power from an interrogating signal from a rf scanner (in some cases, broadcasting constantly) could be used for certain tasks.] In some embodiments, a smart tag that combines RFID tag functionality with printed ID functionality (e.g., with use of barcodes or other 1D visual codes, QR codes or other 2D visual codes, 3D visual codes, numbers, letters, text, code, etc.) may also be used. Alternative, or additional, to the ID tags 130, image recognition or photogrammetric recognition functionality (particularly as enhanced by use of AI system 140 or the like) may be used to perform, or aid in the performance of, identification of objects of interest among the objects 125. For example, the system might capture a current digital image of at least a portion of an object 125 and might utilize image recognition or photogrammetric recognition functionality to identify the object 125 based on analysis of the captured current digital image of the at least a portion of the object 125 itself (i.e., by identifying a unique identifying feature or attribute of the object 125, or the like). Alternatively, or additionally, the system might utilize image recognition or photogrammetric recognition functionality to identify the object 125 based on analysis of a digital image of at least a portion of the object 125 itself or of a representative example of the object 125 that is used as an ID tag 130 on the object 125. The computing system 105a, the database(s) 110a, the AR goggles 115a-115n that are worn or wearable by respective users 120a-120n, and the objects 125a-125n, or the like, might be disposed in work environment 135, which might include, but is not limited to, one of a laboratory, a construction site, a machine shop, a workshop, a factory, or a room, and/or the like.

System 100 might further comprise an artificial intelligence ("AI") system 140 (optional) that might communicatively couple to computing system 105a via network(s) 145. In some embodiments, the AI system 140—which might include, but is not limited to, at least one of a machine learning system(s), a learning algorithm-based system(s), or a neural network system(s), and/or the like—might be used to improve identification of objects by learning how to optimize resolution of images of visual-based ID tags of objects or by learning how to implement and optimize image processing techniques (including, without limitation, panning, tilting, and/or zooming, or the like) to orient and/or magnify images of visual-based ID tags, and/or the like. The AI system 140 might also be used to learn or anticipate identification of objects (e.g., by improving image recognition or photogrammetric recognition of objects, or the like), to learn or anticipate identification of tasks (e.g., to improve communication with databases, or to improve query techniques used to query the databases, or the like), to learn or anticipate behavior of users (e.g., to anticipate or facilitate commands by the users, etc.), or the like. In some cases, feedback loops of data may be used as part of the learning processes implemented by the AI system 140. According to some embodiments, alternative or additional to the computing system 105a and corresponding database 110a being disposed within work environment 135, system 100 might comprise remote computing system 105b (optional) and corresponding database(s) 110b (optional) that communicatively couple with at least one of the one or more AR headsets 115a-115n in the work environment 135 via the one or more networks 145. Herein, although some components of system 100 are indicated as being optional while others are not, this is merely for the particular embodiment as shown, and, in other embodiments, one or more of the former set of components (or components indicated as being "optional") may be required while one or more of the latter set of components (or components not indicated as being "optional") may in fact be optional.

According to some embodiments, computing system 105a might include, without limitation, one of a processor disposed in the AR headset, or a computing system disposed in the work environment, and/or the like. In some cases, remote computing system 105b might include, but is not limited to, at least one of a remote computing system disposed external to the work environment and accessible over a network, or a cloud computing system, and/or the like. The AI system 140 might be used to facilitate operation by computing system 105a, computing system 105b, and/or at least one AR headset 115. Merely by way of example, network(s) 145 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, network(s) 145 might each might include an access network of an Internet service provider ("ISP"). In another embodiment, network(s) 145 might each might include a core network of the ISP, and/or the Internet.

In some embodiments, each AR headset (e.g., AR headset 115n as shown in FIG. 1, or the like) might include, without limitation, at least one of a processor 150, a data store 155, a speaker(s) or earpiece(s) 160 (optional), eye tracking sensor(s) 165 (optional), light source(s) 170 (optional), audio sensor(s) or microphone(s) 175 (optional), front or front-facing camera(s) 180, display screen(s) or projector(s) 185, and/or transceiver(s) 190, and/or the like. In some instances, the processor 150 might communicatively couple (e.g., via a bus, via wired connectors, or via electrical pathways (e.g., traces and/or pads, etc.) of printed circuit boards ("PCBs") or integrated circuits ("ICs"), and/or the like) to each of one or more of the data store 155, the speaker(s) or earpiece(s) 160 (optional), the eye tracking sensor(s) 165 (optional), the light source(s) 170 (optional), the audio sensor(s) or microphone(s) 175 (optional), the front camera(s) 180, the display screen(s) or projector(s) 185, and/or the transceiver(s) 190, and/or the like.

The processor 150 might perform functionalities of the AR-based assistance as described herein, either as a separate computing system or in conjunction with the computing system 105a or 105b and/or with the AI system 140. The data store 155 (or the database(s) 110a or 110b) might store at least one of data regarding identified objects, data regarding tasks, data regarding the first task (and processes associated therewith), data regarding user preferences of each of one or more particular users, data regarding communications protocols or identifiers with other devices (e.g., computing system 105a or 105b, AI system 140, or the like) or user devices (not shown; including, but not limited to, smart phones, mobile phones, tablet computers, laptop computers, desktop computers, or monitors, or the like), and/or the like. The speaker(s) (which might be disposed on a housing of the AR headset 115 and directed toward the ears of the user or directed around the AR headset 115) or earpiece(s) 160 (which are intended to fit in or around the user's ears, or the like) might provide aural or verbal information or instructions to the user. The eye tracking sensor(s) 165—which might include, without limitation, at least one of one or more cameras, one or more motion sensors, or one or more tracking sensors, and/or the like—track where the user's eyes are looking, which in conjunction with computation processing by the processor 150, the computing system 105a or 105b, and/or the AI system 140 to compare with images or videos taken in front of the AR headset 115, to determine what objects or portions of the work environment 135 the user is looking at or focusing on. The light source(s) 170 might provide at least one of broad illumination of a portion of the work environment, illumination of objects of interest as an alternative to image overlays highlighting such objects of interest, or illumination of a portion of the work environment corresponding to what the user is looking at, and/or the like. The audio sensor(s) 175 might include, but is not limited to, microphones, sound sensors, or noise sensors, and/or the like, and might be used to receive or capture voice signals, sound signals, and/or noise signals, or the like that may be processed to detect input, commands, or interactions by the user, to detect sounds relevant to tasks being performed within the work environment 135, or to detect noise signals that may be used to improve noise cancelling functionality of the AR headset 115, and/or the like. The front camera(s) 180 may be used to capture images or video of an area in front of the AR headset 115, with a field of view of each front camera 180 overlapping with a field of view of an eye(s) of the user 120, the captured images or video. The display screen(s) and/or projector(s) 185 may be used to display or project the generated image overlays (and/or to display a composite image or video that combines the generated image overlays superimposed over images or video of the actual area). The transceiver 190 is used to communicate wirelessly with the computing system 105a or with a communications relay device(s) (not shown), to transfer data (including, but not limited to, at least one of data regarding identified objects, data regarding tasks, data regarding the first task (and processes associated therewith), data regarding user preferences of each of one or more particular users, data regarding communications protocols or identifiers with other devices, and/or the like. In some embodiments, wireless AR headsets may be used (as depicted in FIG. 1 by lightning bolt symbols between AR headsets 115 and computing system 105a), while wired AR headsets may be in used in other embodiments (not shown in FIG. 1).

According to some embodiments, system 100 might further comprise one or more (area) cameras 195 (optional) that are disposed within work environment 135 yet external to any of the AR headsets 115, the one or more cameras 195 being communicatively coupled to the computing system 105a via wired communication (depicted in FIG. 1 by the line between the camera(s) 195 and the computing system 105a) or via wireless communication (depicted in FIG. 1 by the lightning bolt symbol between the camera(s) 195 and the computing system 105a). These cameras 195 may be used to capture images or videos of areas within the work environment 135 in other to supplement and/or complement the images or videos captured by the front camera(s) 180 housed on each of the AR headsets 115. In this manner, the images or video captured by the camera(s) 180 of an AR headset 115 together with the images or video captured by the camera(s) 195 may be analyzed by the processor 150, the computing system 105a or 105b, and/or the AI system 140 to identify objects of interest among the objects 125, in some cases, providing different fields of view or visual perspectives to capture more easily identifiable features of the objects of interest or to capture more easily seen portions of the ID tags 130, particularly if the object of interest is oriented in a manner relative to the AR headset 115 that is difficult for the camera(s) 180 of the AR headset 115 to capture images or video that is easily identifiable by the system. In some embodiments, the front camera(s) 180 of two or more AR headsets 115 may be used to capture images or videos of different areas or perspectives of the work environment 135 to achieve a similar functionality as the use of camera(s) 195 in conjunction with front camera(s) 180 of one of the AR headsets 115. In some cases, the images or video captured by the camera(s) 180 of the two or more AR headsets 115 together with the images or video captured by the camera(s) 195 may be analyzed by the processor 150, the computing system 105a or 105b, and/or the AI system 140 to identify objects of interest among the objects 125, thereby further facilitating identification of objects of interest due to the increased number of views or perspectives afforded by the camera(s) of multiple AR headsets and the area camera(s) 195.

In operation, at least one of the front camera(s) 180 of a first AR headset 115a, the front camera(s) 180 of one or more other AR headsets 115b-115n, and/or the camera(s) 195 (collectively, "image capture device(s)" or "camera(s)"

or the like) might capture images or video of at least a first portion of work environment 135. In some cases, (particularly, with the images or videos captured by the front camera(s) 180 of the first AR headset 115a) the captured images or video might overlap with a field of view of the eyes of the first user 120a wearing the first AR headset 115a. The image capture device(s) might subsequently send the captured images or video. At least one of the processor 150 of the first AR headset 115a, the computing system 105a, the remote computing system 105b, and/or the AI system 140 (collectively, "the computing system" or the like) might receive the captured images or video (collectively, "captured images" or the like) from the image capture device(s), might analyze the received captured images to identify one or more first objects 125 among the one or more objects 125a-125n, might query at least one database (e.g., data store 155, database(s) 110a, and/or database(s) 110b, or the like) to determine a first task associated with at least one first object among the identified one or more first objects 125, and might generate a first image overlay. In some embodiments, the first image overlay might provide at least one of a graphical icon-based instruction, a text-based instruction, an image-based instruction, or a highlighting-based instruction, and/or the like, each indicative of one or more instructions to be presented to first user 120a to implement the first task associated with the at least one first object 125. The computing system might then display, to the eyes of the first user 120a through the AR headset, the generated first image overlay that overlaps with the field of view of the eyes of the first user 120a.

In some embodiments, particularly in cases where the speaker(s) or earpiece(s) 160 is part of the AR headset 115a, the computing system might generate one or more audio-based instructions (which might include, but is not limited to, at least one of a tone, a series of tones, spoken instructions, or test-to-speech content, and/or the like) corresponding to each of at least one of the one or more instructions to be presented to the user via the generated first image overlay, and might present (via the speaker(s) or earpiece(s) 160 of AR headset 115a) the generated one or more audio-based instructions in conjunction with displaying corresponding each of at least one of the one or more instructions being presented to the user via the generated first image overlay as displayed to the eyes of the first user 120a through the AR headset 115a.

In accordance with the various embodiments described herein, the augmented reality ("AR") system provides for generation of image overlays (including, but not limited to, at least one of graphical icon-based overlays, text-based overlays, image-based overlays, or highlighting-based overlays, and/or the like) that are superimposed over either an actual view of an area (e.g., work environment or the like) or an image or video of the area. In the former case, the actual view of the area might be viewed by the user through a lens, visor, transparent screen, or the like, with the generated image overlays either being projected directly into the eyes of the user, being projected on a projection plane or surface in front of the eyes of the user (e.g., on the plane or surface defined by the lens, visor, transparent screen, or the like), or being displayed on the surface of the lens, visor, or transparent screen, or the like. Alternatively, for AR headsets without a lens, visor, transparent screen, or other component disposed between the eyes of the user (or the user's personal corrective lenses), the actual view of the area might be viewed directly by the eyes of the user (or through only the user's personal corrective lenses), with the generated image overlays either being projected directly into the eyes of the user or being projected as a hologram in front of the eyes of the user, or the like. In the latter case, the image or video of the area might be viewed by the user using a display screen disposed in front of the user (which might include, but is not limited to, a display screen integrated within the AR headset or a display screen of an AR-enabled smart phone that is mounted in the AR headset in front of the eyes of the user, etc.), with the generated image overlays being superimposed over the image or video of the area prior to the composite image or video being displayed on the display screen. In the various embodiments, the generated image overlays are superimposed over the image or video of the area, with the image or video being displayed in real-time or near-real-time. The use of the AI system 140 or other computing process enhancers or parallel processors to reduce the computational time for identification of objects of interest, querying databases to determine tasks associated with the objects of interest, generation of image overlays based on the determined tasks in relation with the objects of interest, and display or projection of the generated image overlays to the user, in order to achieve the real-time or near-real-time AR experience for the user.

According to some embodiments, the at least one of the graphical icon-based instruction, the text-based instruction, the image-based instruction, or the highlighting-based instruction, and/or the like, might include, but is not limited to, at least one of a graphical icon-based instruction, a text-based instruction, an image-based instruction, or a highlighting-based instruction that, when displayed within the generated first image overlay, is superimposed over, displayed around, or displayed beside the at least one first object as viewed by the user through the AR headset. Merely by way of example, the graphical icon-based instruction might include, without limitation, at least one of a graphical icon representing identification information associated with the at least one first object; a graphical icon representing identification information associated with a second object with which the at least one first object is intended to interact as part of the first task; a colored graphical icon distinguishing one first object from another first object among the at least one first object; a graphical icon comprising a directional arrow representing a direction that the at least one first object should be taken as part of the first task; or a colored graphical icon comprising a colored directional arrow distinguishing a first direction that the at least one first object should be taken as part of the first task from a second direction that a third object should be taken as part of the first task, and/or the like.

In some instances, the text-based instruction might include, but is not limited to, at least one of a floating text window comprising textual instructions corresponding to the first task; or a surface text window that is superimposed on one of a table-top surface, a wall surface, or an object surface and that comprises textual instructions corresponding to the first task. In some cases, the floating text window, when displayed within the generated first image overlay, is displayed as a floating image beside the at least one first object or displayed as a floating image within the field of view of the eyes of the first user. In some instances, the image-based instruction might include, without limitation, at least one of an image representing identification information associated with the at least one first object; an image representing identification information associated with a second object with which the at least one first object is intended to interact as part of the first task; an image comprising a directional arrow representing a direction that the at least one first object should be taken as part of the first task; an image comprising images of numbers or codes representing an order of processes of the first task associated with the at least one first object; a magnified image of the at least one first object; a three-dimensional ("3D") image or hologram; or an image of the at least one first object superimposed over a targeted portion of the work environment indicating at least one of position, orientation, or configuration of the at least one first object intended for placement at the targeted portion; and/or the like. In some cases, the highlighting-based instruction might include, but is not limited to, at least one of a highlighting field that, when displayed within the generated first image overlay, is superimposed over the at least one first object; a highlighting field that, when displayed within the generated first image overlay, is superimposed over a fourth object that is related to the first task associated with the at least one first object; or a highlighting field that, when displayed within the generated first image overlay, is superimposed over a targeted portion of the work environment indicated intended placement of the at least one first object at the targeted portion; and/or the like.

In some cases, the light source(s) 170 of the first AR headset 115a might illuminate one or more of the at least one first object 125a or the at least a first portion of the work environment 135 during at least one of the following periods: prior to the one or more first images being captured by the image capture device(s); or in conjunction with the display of the generated first image overlay; and/or the like.

In some embodiments, the computing system, using the eye tracking sensor(s) 165 that are disposed on the first AR headset 115a and that have a field of view that includes the eyes of the first user 120a (i.e., that are directed at the eyes of the first user 120a, or the like), might track the eyes of the first user 120a to determine a direction in which the first user is looking, and might determine a central portion of a field of view of the first user (i.e., determine what the first user 120a is looking at, or the like) based at least in part on the determined direction that the first user 120a is looking in conjunction with the captured images as captured by the image capture device(s). In some instances, in response to determining the central portion of the field of view of the first user (i.e., in response to determining what the first user is looking at, or the like), the computing system might identify at least one fifth object (in a manner similar to the process described above with regard to identification of the one or more first objects).

Figure 2A:
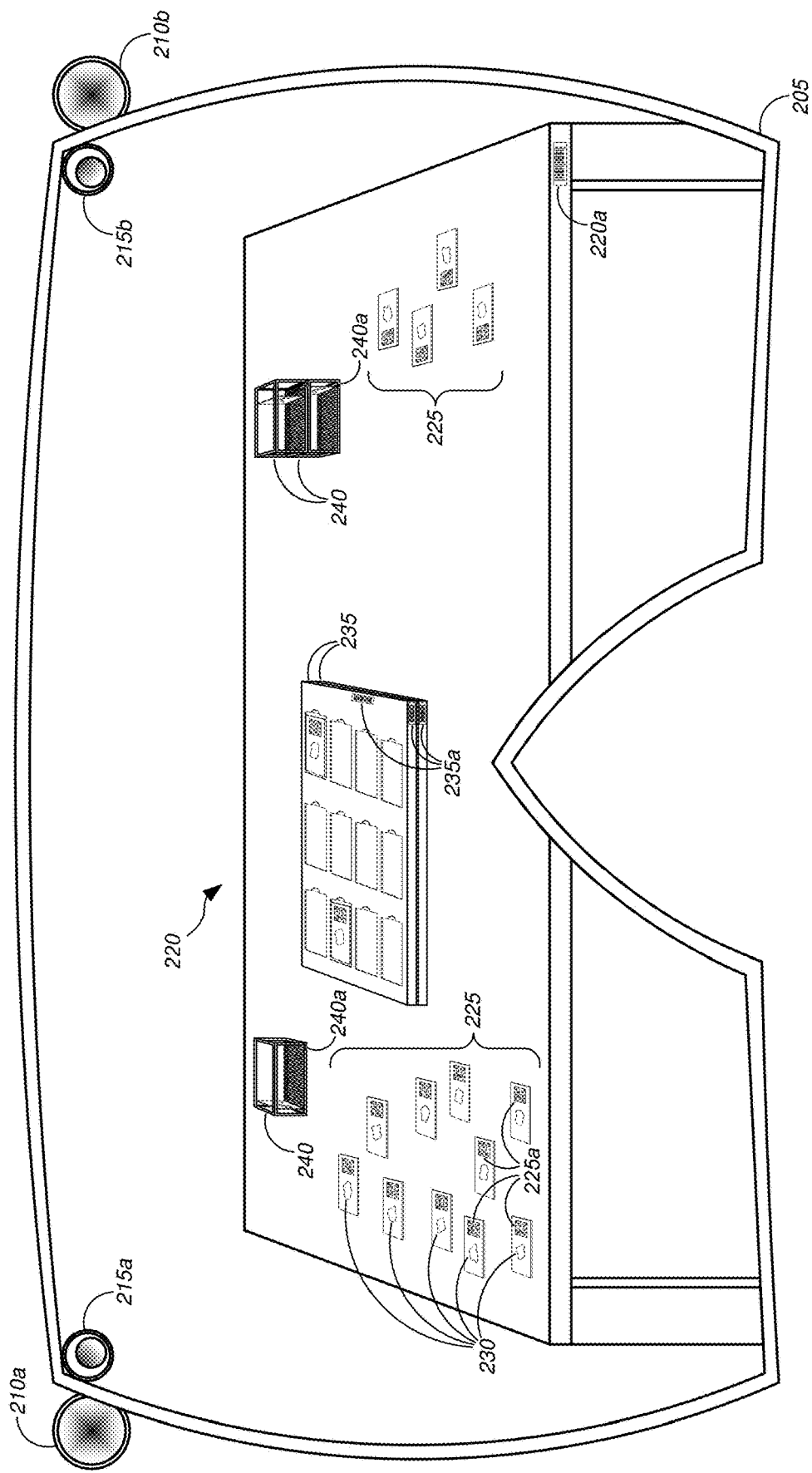
FIGS. 2A and 2B are schematic diagrams illustrating a set of non-limiting examples of sorting, categorizing, arranging, or organizing of objects performed by a user utilizing an AR headset that is used for implementing AR-based assistance within a work environment, in accordance with various embodiments.
Figure 2B:
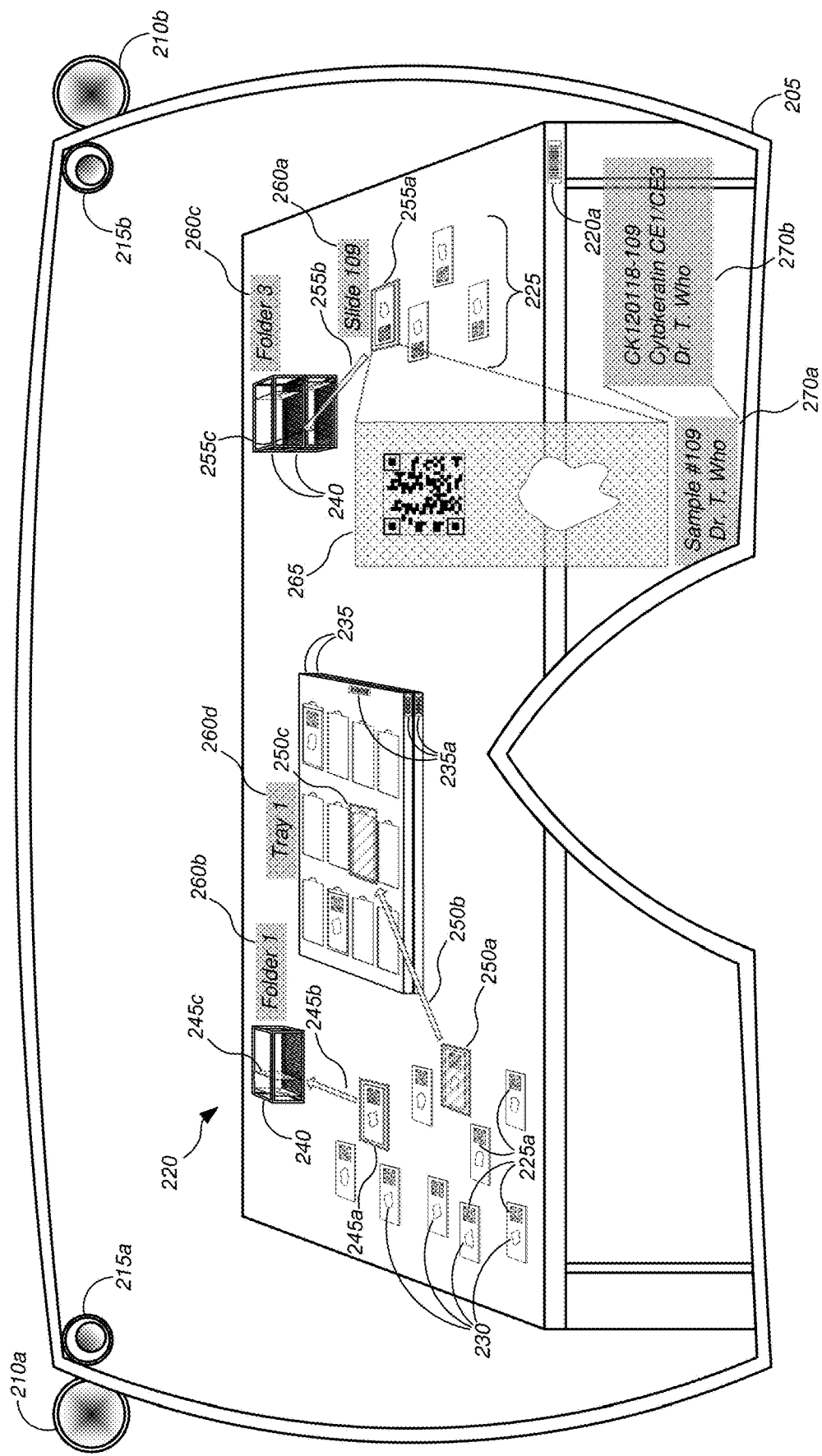
Figure 3A:
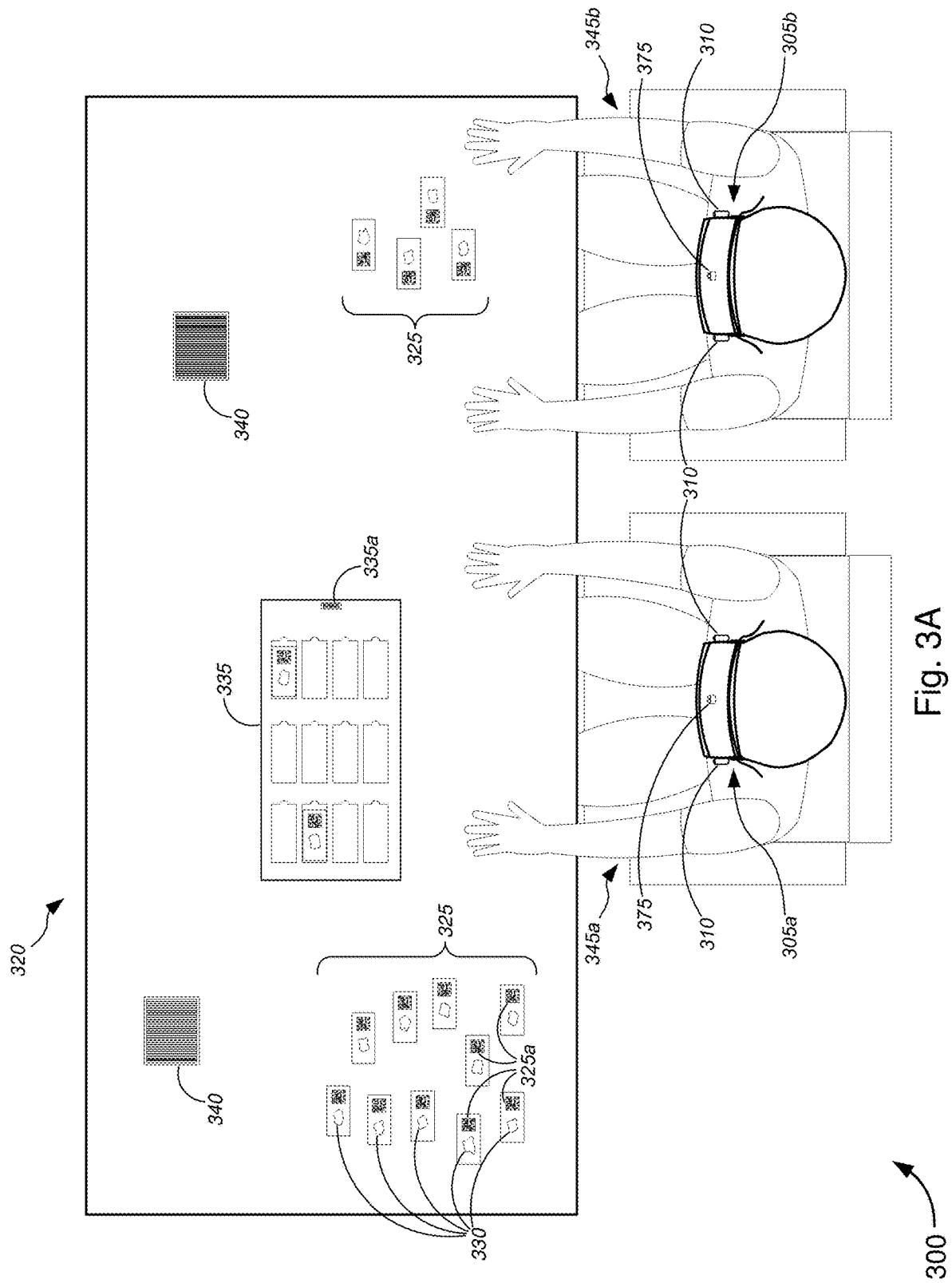
FIGS. 3A and 3B are schematic diagrams illustrating a set of non-limiting examples of sorting, categorizing, arranging, or organizing of objects performed by a plurality of users by utilizing AR headsets that are used for implementing AR-based assistance within a work environment, in accordance with various embodiments.
Figure 3B:
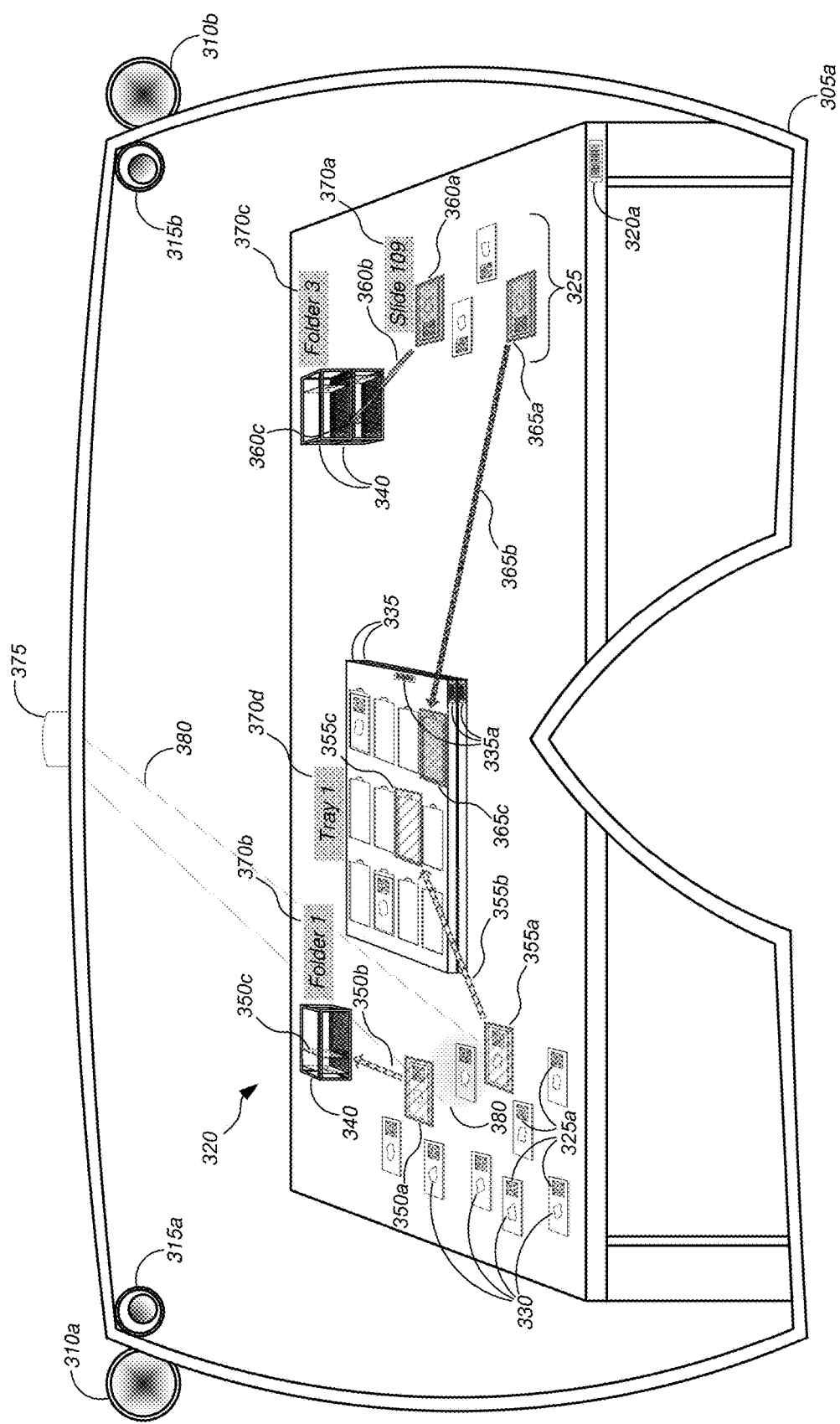

In various aspects, the first task might comprise sorting, categorizing, arranging, or organizing the one or more first objects, wherein the one or more objects might comprise one or more microscope slides each containing a test sample or a tissue sample (among other laboratory instruments, tools, objects, or equipment), as depicted in the non-limiting examples of FIGS. 2A and 2B. Alternatively, the first task might include, without limitation, one of running a test sample or a tissue sample using laboratory instrumentation, solving a puzzle, assembling a piece of machinery, assembling an object, preparing a test sample or a tissue sample, identifying and/or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like. In such cases, the one or more first objects might include, but are not limited to, one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like. In some cases, a plurality of users 120a-120n may be tasked with performing the first task (as depicted in FIG. 3A, or the like), where each user 120 wears an AR headset 115 that displays generated image overlays to each user 115 that distinguishes objects that one user is intended to interact with from objects that the other users among the plurality of users are intended to interact with as part of the first task (as depicted in FIG. 3B, or the like). In some embodiments, the work environment might include, without limitation, one of a laboratory, a construction site, a machine shop, a workshop, a factory, or a room, and/or the like.

These and other functions of the system 100 (and its components) are described in greater detail below with respect to FIGS. 2-4.

FIGS. 2A and 2B (collectively, "FIG. 2") are schematic diagrams illustrating a set of non-limiting examples 200 and 200' of sorting, categorizing, arranging, or organizing of objects performed by a user utilizing an AR headset that is used for implementing AR-based assistance within a work environment, in accordance with various embodiments. FIG. 2A depicts a non-limiting example 200 of a user's perspective looking through an AR headset that either allows the user to see the actual work environment or displays images or video of the actual work environment, without use of AR image overlays, while FIG. 2B depicts a non-limiting example 200' of the first user's perspective looking through the AR headset that includes a generated AR image overlay superimposed over either the actual work environment or the displayed images or video of the actual work environment. Sorting of slides is described in greater detail in the '122 Application (which has already been incorporated herein by reference in its entirety for all purposes), in which "artificial reality" refers to "augmented reality" as described herein. Although the sorting, categorizing, arranging, or organizing of objects is shown with respect to FIG. 2 as being a task that may be enhanced by the use of AR-based assistance or functionality as described herein, the various embodiments are not so limited, and the task that may be enhanced by the use of AR-based assistance or functionality may alternatively include, without limitation, one of running a test sample or a tissue sample using laboratory instrumentation, solving a puzzle, assembling a piece of machinery, assembling an object, preparing a test sample or a tissue sample, identifying and/or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like (not shown), to be performed in corresponding one of a laboratory, a construction site, a machine shop, a workshop, a factory, or a room, and/or the like, where objects of interest within such work environments might include, but are not limited to, one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like.

According to some embodiments, examples 200 and 200' of FIGS. 2A and 2B might comprise an AR headset 205, one or more front or front-facing cameras 210a or 210b (collectively, "cameras 210" or "image capturing devices 210"

or the like), one or more eye tracking sensors 215a or 215b (collectively, "eye tracking sensors 215" or "eye tracking cameras 215" or the like), and/or the like.

Prior to AR functionality being implemented, a view of a portion of the work environment (e.g., a laboratory, a construction site, a machine shop, a workshop, a factory, or a room, or the like) may be seen by a user when wearing the AR headset 205. In some cases, such a view may be provided through a viewport (e.g., a lens, visor, or transparent screen, or the like) of the AR headset 205, or via a display screen (e.g., a display screen integrated within the AR headset 205, or a display screen of an AR-enabled smart phone that is mounted in the AR headset 205 in front of the eyes of the user, or the like) displaying an image or video of the portion of the work environment. For instance, referring to FIG. 2A, a view of a portion of a work environment (in this case, a laboratory, or the like) is seen by a user through the AR headset 205. Within such a view might be a table or counter 220, on which might be disposed a plurality of microscope slides 225 to be sorted, categorized, arranged, or organized as part of a task to be completed by a user, where each slide 225 might have affixed thereto an identifier or identification ("ID") tag 225a. In the non-limiting example of FIG. 2, each microscope slide 225 might contain a sample 230 for testing, cataloguing, or other laboratory or scientific purpose. As part of the task associated with the slides 225, a user may be tasked with sorting, categorizing, arranging, or organizing the slides 225, which might involve placing particular slides (or sets/groups of slides) in particular trays 235 or containers 240 (each type of which, in some cases, may be stackable, as shown in FIG. 2), each tray 235 or container 240 having an ID tag 235a or 240a, respectively, affixed thereto. In some cases, the table or counter 220 might also have an ID tag 220a affixed thereto.

In some instances, the ID tags 220a, 225a, 235a, and/or 240a might each comprise a unique identifier, which might include, without limitation, a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the object itself or of a representative example of the object (e.g., digital image of at least a portion of a tissue sample or tissue section, table, tray, container, instrumentation, tool, or other object, etc.), or a unique identifying feature or attribute (of an object among one or more objects 220, 225, 235, 240, etc.) (shown in FIG. 2), and/or the like. Alternatively, or additionally, at least one of the ID tags 220a, 225a, 235a, and/or 240a might each comprise a radio frequency identifier ("RFID") tag, or the like, that when interrogated by a radio frequency scanner (which may be disposed in the AR headset 205 (not shown in FIG. 2), or may be disposed within a dedicated RFID scanner or other similar device (not shown in FIG. 2)) would broadcast identification information (which might include the unique identifier data, or the like) in rf response signals. [This describes a passive RFID tag, although a battery-assisted passive RFID tag may be used. An active RFID tag that broadcasts its data without need of power from an interrogating signal from a rf scanner (in some cases, broadcasting constantly) could be used, but within the slide sorting, categorizing, arranging, or organization context, the computing system (such as described above with respect to FIG. 1) may be required to distinguish amongst the multitude of rf signals from the plurality of slides. A rf scanner having a narrow field of rf interrogation for interrogating passive or battery-assisted passive RFID tags within a limited area would avoid the problem inherent with active RFID tags for such a task. For other tasks that do not involve many RFID tags within a limited area, active RFID tags may function as well or better than passive or battery-assisted passive RFID tags. Alternatively, even for tasks that involve many RFID tags within a limited area (such as the slide sorting, categorizing, arranging, or organization of objects, etc.), the use of gaze focusing techniques as described below (i.e., tracking what the central portion of the field of view of the user to determine what the user is looking at) or the use of gestures by the user's hand(s) (i.e., having the user point directly at a particular object(s) having an RFID, or the like) or the use of gestures by a pointer or selection device(s) operated by the user, and/or the like, may serve as a trigger to filter out (in any generated image overlays) active RFID tag information associated with objects that are outside of these areas (i.e., outside of the central portion of the field of view of the user, outside the area where the user is pointing with the user's hand(s), or outside the area where the user is pointing using the pointer or selection device, etc.).] In some embodiments, a smart tag that combines RFID tag functionality with printed ID functionality (e.g., with use of barcodes or other 1D visual codes, QR codes or other 2D visual codes, 3D visual codes, numbers, letters, text, code, etc.) may also be used. Alternative, or additional, to the use of ID tags 220a, 225a, 235a, and/or 240a for identification of objects (such as the tables or counters 220, slides 225, the trays 235, or the containers 240, and/or the like), image recognition or photogrammetric recognition functionality (particularly as enhanced by use of an AI system or the like) may be used to perform, or aid in the performance of, identification of objects of interest among the objects.

With reference to FIG. 2B, AR-based assistance may be implemented (a non-limiting example 200' of which is shown in FIG. 2B). In particular, the cameras 210a and/or 210b might capture an image(s) or video (collectively, "captured images" or the like) of the portion of the work environment (e.g., laboratory in this case, or the like). A computing system (such as at least one of the processor 150 of the first AR headset 115a, the computing system 105a, the remote computing system 105b, and/or the AI system 140 of FIG. 1, or the like, as described above) might receive the captured images from the cameras 210a and/or 210b, might analyze the captured images to identify one or more first objects among the objects present in the captured images of the work environment, might query a database (e.g., data store 155, database(s) 110a, and/or database(s) 110b of FIG. 1, or the like) to determine a first task associated with at least one first object among the identified one or more first objects, and might generate a first image overlay. In some embodiments, the first image overlay might provide at least one of a graphical icon-based instruction, a text-based instruction, an image-based instruction, or a highlighting-based instruction, and/or the like, each indicative of one or more instructions to be presented to the user to implement the first task associated with the at least one first object. The computing system might then display, to the eyes of the user through the AR headset 205, the generated first image overlay that overlaps with the field of view of the eyes of the first user. Turning to FIG. 2B, the first image overlay might include, but is not limited to, a first series of instructions 245, a second series of instructions 250, and a third series of instructions 255, and/or the like.

In some embodiments, such as depicted in FIG. 2B, the first series of instructions 245 might include, without limitation, a graphical icon or image in the shape of a microscope slide outline 245*a* that, when displayed in the first image overlay, appears to the user to surround a first slide 225 among the plurality of slides 225; an image of an arrow 245*b* that points from the first slide 225 to a particular slot within a first container 240 (denoted as "Folder 1" in FIG. 2B); and a hologram or image of a slide 245*c* fitting within the particular slot within first container 240; or the like. In a similar manner, the second series of instructions 250 might include, but is not limited to, a highlighting-based field 250*a* that covers a second slide 225 among the plurality of slides 225; an image of an arrow 250*b* that points from the second slide 225 to a particular indentation, cut-out, or bed within a tray 235 (denoted as "Tray 1" in FIG. 2B); and a highlighting-based field 250*c* that covers the particular indentation, cut-out, or bed within the particular tray 235; or the like. Likewise, the third series of instructions 255 might include, without limitation, a graphical icon or image in the shape of a microscope slide outline 255*a* that, when displayed in the first image overlay, appears to the user to surround a third slide 225 (denoted as "Slide 109" in FIG. 2B) among the plurality of slides 225; an image of an arrow 255*b* that points from the third slide 225 to a particular slot within a third container 240 (denoted as "Folder 3" in FIG. 2B); and a highlighting-based field or image 255*c* outlining the bottom portion of the particular slot within third container 240; or the like.

Although the first through third sets of instructions are depicted together in FIG. 2B, this is done simply for illustration of some (but not all) of the different types of instructions that may be displayed in a graphical manner to the user to indicate one or more tasks to be completed by the user. The various embodiments are not so limited, however, as these types of instructions may be provided serially (i.e., one after the other, perhaps in priority according to some preset criteria). In some cases, the concurrent or serial sets of instructions might have consistent characteristics or features in accordance with either default display settings or preferences of the user, which might be conditioned based on one or more of the following: the types of objects, ease of illustration, the need to avoid confusion, and/or the like. In some instances, some (or all) of the icons, images, highlighting fields, text fields, and/or the like might be made to flash, blink, vibrate, and/or change color to attract the attention of the user, or to emphasize importance or priority, or the like. In some cases, some (or all) of the icons, images, highlighting fields, text fields, and/or the like might be made to appear to be projected on a surface (e.g., table-top surface, wall surface, surface of an object (which can be but need not be flat), or projected as a floating hologram or floating window (or info screens), or the like, that are either stationary or movable to track motion of objects, or the like. Although not shown, icons including, but not limited to, biohazard icons, flammable caution icons, caustic caution icons, poisonous caution icons, and/or the like may be generated in the image overlays to hover above, around, beside, or near particular objects exhibiting the corresponding trait, or the like.

In some embodiments, rather than instructions, information may be displayed; for purposes of simplicity of description, however, such information is also referred to herein as instructions. For example, text-based tags 260 may be displayed, as an image overlay, beside or around some or all of relevant objects within the work environment. The text-based tags 260 might include, for instance, a slide-identifying text-based tag 260*a* (e.g., identifying "Slide 109" or the like), a container-identifying text-based tag 260*b* (e.g., identifying "Folder 1" or the like), another container-identifying text-based tag 260*c* (e.g., identifying "Folder 3" or the like), and a tray-identifying text-based tag 260*d* (e.g., identifying "Tray 1" or the like). According to some embodiments, the computing system might enhance, modify, or otherwise change an image of the object of interest. For instance, an image of the third slide 225 (i.e., "Slide 109") might be image-processed to enlarge (or magnify) the original image (to effect a "zoomed-in" feature) and to rotate, pan, and/or tilt the image to present a top view of the third slide 225 displayed vertically, in order to provide the user with a close-up view of the third slide (or object of interest). Such image-processing may be initiated in response to selection by the user (e.g., by gazing intently at the third slide, by gazing at the third slide coupled with verbal instructions to "focus-in" on the third slide (or the like), by selecting using a virtual cursor (or the like; not shown), by pointing at the third slide with the user's finger (or the like; not shown), etc.). Alternative, or additional, to the display of close-up view of the third slide (or object of interest), the user might select to display additional information about the third slide, such information either being decoded from the ID tag 225*a* of the third slide 225 or retrieved from the database based on the unique identifier information embedded within the ID tag 225*a*. In some cases, such information might include sample number (e.g., "Sample #109" or the like) and a name of a person working with the sample on the slide (e.g., "Dr. T. Who" or the like), which may be displayed as a text-based image overlay 270*a*. In some instances, the user might seek more detailed information about the object—in this case, sample unique ID (e.g., "CK120118-109"), sample type or name (e.g., "Cytokeratin CE1/CE3" or the like), and name of a person working with the sample on the slide (e.g., "Dr. T. Who" or the like), which may be displayed as a text-based image overlay 270*b*. Although particular examples of image overlays are illustrated in FIG. 2B, the various embodiments are not so limited, and any suitable type, shape, configuration, orientation, color, or size of image overlays may be used consistent with the embodiments described herein.

Also, although not shown, the image overlay may include instructions for the user to move a tray or container from one location to another (before or after being filled with slides), to move from one location (e.g., table or counter) to another, to change the order, orientation, or arrangement of trays or containers, and/or the like. Further, the computing system might continuously, periodically, or upon a condition being met (e.g., filling of at least 50% or 75% of a tray or container, or the like) identify the slides placed in the particular tray or container, and determine whether the correct slides are placed in the correct tray or container (and in the correct cut-outs or slots). If a mistake has been made, the computing system might generate and display an image overlay with instructions to the user to make the correction. Moreover, in addition to the visual aspect of the system, as illustrated by the AR image overlays, the computing system might interact with the user via aural or verbal communications (e.g., using the speaker(s) or earpiece(s) 160 and the audio sensor(s) 175 of FIG. 1, or the like, as described above). For instance, upon completion of a task, or sub-task, the computing system might generate and display image overlays indicating successful completion of the task or sub-task (in some cases, in conjunction with verbal communication indicating the same).

According to some embodiments, the eye tracking sensors 215 may be used (perhaps in conjunction with audio commands as monitored by audio sensors (such as audio sensor(s) 175 of FIG. 1, or the like; not shown in FIG. 2)) to register or track commands issued by the user. For example, the user might gaze at a certain folder for some period of time exceeding a predefined amount of time (e.g., 3 seconds, or the like), which might indicate that the user desires to select this particular folder, resulting in the selected folder being highlighted by an image overlay (e.g., a highlighting-based field, floating hologram, or other appropriate image, or the like). Alternatively, the user might look at a particular folder and might concurrently say the command, "Select," which might indicate that the user desires to select this particular folder, resulting in the selected folder being highlighted by an image overlay (e.g., a highlighting-based field, floating hologram, or other appropriate image, or the like) as above. In another alternative, the user might look at a particular folder and might perform a gesture with the user's hand(s) or a pointer or selection device(s) (in accordance with predefined characteristics or parameters for a selection gesture), which indicate that the user desires to select this particular folder, resulting in the selected folder being highlighted by an image overlay (e.g., a highlighting-based field, floating hologram, or other appropriate image, or the like) as above. Once a folder is selected, the user can ask for additional information (e.g., "how many slides are missing to close this folder?" or "who is the doctor assigned to this particular slide?", etc.). In another example interaction, an incoming request from Dr. Who might indicate to finish the folder for Patient X ASAP, in which case, a technician or user might say, "show me Patient X folder," or might select the folder using one of the methods indicated above. Once the technician or user has selected the folder, he or she can say, "High priority" or similar phrase, which would result in the computing system elevating the priority of the folder, and generating and displaying image overlays (perhaps in conjunction with verbal instructions) to fill the folder first with appropriate marking or highlighting of the applicable or relevant slides to finish the folder for Patient X.

In the case that the computing system cannot properly identify an object, the computing system might generate and display an image overlay (e.g., a highlighting field) displayed so as to appear to the user to cover or highlight the object, with text and/or verbal instructions to the user to take a closer look at the marked slide (e.g., by moving closer, by orienting the user's head for a better angle, by removing any obstructing object, by picking up the marked object, and/or the like). In some cases, the user may be instructed in this manner to read out any identifiers (e.g., numeric codes, alphanumeric codes, text, and/or the like).

The various features or characteristics of the AR-based assistance implementation (and the various image overlays and instructions) described above with respect to FIG. 2, although directed to the task of sorting, categorizing, arranging, or organizing of objects (in particular, slides 225), may similarly be applicable to sorting, categorizing, arranging, or organizing of other objects (either in a laboratory or in other settings or work environments) or may likewise be applicable to other tasks, including, but not limited to, running a test sample or a tissue sample using laboratory instrumentation, solving a puzzle, assembling a piece of machinery, assembling an object, preparing a test sample or a tissue sample, identifying and/or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like, as applicable, as appropriate, or as desired.

For instance, in a non-limiting example of the use case involving running the sample using laboratory instrumentation, the computing system might identify (by the techniques described herein) which model of instrumentation (e.g., which particular model of a mass spectrometer, a gas chromatography system, a liquid chromatography system, etc.) and in response to the user selecting or saying what operation he, she, or they would like to run (e.g., "Run mass spectrometry analysis on Sample T"; etc.), the computing system might access a user manual of the particular model of instrumentation, and might generate and display image overlays (perhaps also generate and present aural instructions) to the user indicating how to operate the particular piece of instrumentation to complete the task as indicated, and also indicate (using image overlays and perhaps also aural instructions regarding) when, where, and how to prepare the sample for performing the indicated analysis and to indicate (using image overlays and perhaps also aural instructions regarding) when, where, and how to insert the sample into the piece of instrumentation to run the analysis, and to also indicate (using image overlays and perhaps also aural instructions regarding) what buttons, switches, valves, etc. to actuate and when to do so.

In cases where there is an area camera whose field of view overlaps with the display screen of the instrumentation, the computing system might also generate and display an image overlay that is either a direct image copy or a floating window with information displayed on the instrumentation display screen being scraped and filled into appropriate portions of the floating window. In this manner, the user can move to other areas of the laboratory (i.e., work environment) to perform other tasks or sub-tasks (which may or may not be related to the indicated task (e.g., preparing the sample for performing the task while the instrumentation is warming up, etc.), while being aware from the information displayed in the floating window image overlay (which may be moved to a side or corner of the display area within the AR headset, based on commands by the user (e.g., gaze selection and gaze movement, gaze and verbal phrase selection and movement, selection using a floating mouse or other device, etc.)). Similarly, image overlays may be generated and displayed to provide information to the user, including, but not limited to, when the process by the instrumentation has been successfully completed, when errors occur together with tips and guidance (in the form of text or holograms, etc.) to address the errors, or information regarding the samples as the task is being performed (e.g., real-time temperature, average temperature, expected color change under particular reactions and whether the sample's color change is within expected color spectrum range, expected spectrographs or chromatographs for the particular sample and whether the sample's actual resultant spectrograph or chromatograph is within expected ranges, etc.), and/or the like. In some cases, the computing system might monitor use of instrumentation in the laboratory by other users and might indicate expected wait times for the user to know when such instrumentation is available. These are merely some examples of AR-based assistance that can improve efficiency and optimization in a laboratory, e.g., when using instrumentation to run test or tissue samples, and do not limit the various embodiments to such examples or for such uses of instrumentation.

In the case of solving a puzzle, a non-limiting example might be solving a jigsaw puzzle or the like. In such an example, when the user has joined some pieces of the jigsaw puzzle together, but is stuck in terms of other pieces to join to the partially assembled puzzle, the user might say, "Help" or "Hint," which might trigger the computing system to identify (by the techniques described herein) a random piece among a plurality of pieces that can be joined to the one or more pieces that have already been joined to form the partially assembled puzzle, and to generate and display image overlays that highlight the identified random piece, that highlight the spot that the identified random piece would fit with the one or more pieces of the partially assembled puzzle, and that points (with a holographic arrow or the like) from the highlighted random piece to the highlighted spot. Although assistance with solving a jigsaw puzzle is described, the various embodiments are not so limited, and the AR assistance may be implemented to aid in solving any other type of puzzle.

In the case of assembling a piece of machinery or assembling an object, the computing system might identify (by the techniques described herein) the parts of the machinery or object, might query a database for assembly instructions, and might generate and display image overlays (and perhaps also generate and present aural instructions) that outline the steps (e.g., in a floating window with appropriate still diagram montages or dynamic diagrams showing how one piece is fitted with another, etc.) while also highlighting parts and tools for each step, until the machinery or object has been successfully assembled, at which point the computing system might generate and display image overlays (and perhaps also generate and present aural notifications) indicating successful assembly of the machinery or object. In situations where one or more parts are defective, broken, or simply the wrong part, the computing system might generate and display image overlays (and perhaps also generate and present aural notifications) indicating such and, in some cases, also presenting the user with options to order new parts or to request replacement and/or refund of the machinery or object. Although a particular set of examples is described with respect to AR assistance with assembly of machinery or object, the various embodiments are not so limited, and the AR assistance may be implemented in other ways to assist in the assembly of machinery or objects, consistent with or in accordance with the various embodiments described herein.

In the case of preparing a test sample or tissue sample, a non-limiting example might involve the computing system identifying (by the techniques described herein) which sample, which microscope slides, which labelling machine, etc. to use, and might generate and display image overlays (and perhaps also generate and present aural instructions) indicating use of a micropipette to transfer the identified sample from a vial or tube to a microscope slide, indicating how to stain the sample, indicating how to place another microscope slide to sandwich the stained sample, and indicating how to label the combined slide with an ID tag (such as ID tag 225 as shown in FIG. 2, or the like), in some cases, with the use of highlighting fields, holographic arrows, still diagram montages, and/or moving or dynamic diagrams depicting each step of the preparation. Although a particular set of examples is described with respect to preparation of a sample in microscope slides, the various embodiments are not so limited, and the AR assistance may be implemented in other ways to prepare test or tissue samples, such as preparation of samples that do not involve the use of microscope slides, including, but not limited to, preparing samples for mass spectrometry analysis, preparing samples for gas chromatography analysis, preparing samples for liquid chromatography analysis, etc., consistent with or in accordance with the various embodiments described herein.

In the case of identifying and/or tracking samples within a laboratory, a non-limiting example might involve the computing system uniquely identifying (by the techniques described herein) a sample when it arrives at a laboratory and is subsequently logged in. In response to a customer request being logged in, a laboratory director, a laboratory technician, or an automated standard protocol, or the like might assign appropriate laboratory processes needed to analyze the sample. The computing system might generate and display image overlays (and perhaps also generate and present aural instructions) to users or technicians wearing the AR headsets to identify the sample and to instruct the users or technicians on the current and next appropriate steps in the assigned processes, regardless of whether the sample changes form during any part of the analytical or preparative processes. In some cases, the image overlays might include use of highlighting fields, holographic arrows, still diagram montages, and/or moving or dynamic diagrams depicting each step of the assigned processes. In some instances, the users or technicians might use voice input or the like (e.g., by using a microphone or other audio sensors, such as audio sensor(s) 175 of FIG. 1, or the like) to perform one or more of: changing or correcting the names of the samples; entering, changing, or updating other information about the samples (e.g., composition information, storage information, physician information, laboratory information, etc.); changing one or more steps in the assigned processes; suggesting or changing processes associated with downstream processes involving the samples; etc. Although a particular set of examples is described with respect to identifying and/or tracking samples within a laboratory, the various embodiments are not so limited, and the AR assistance may be implemented in to track other objects other than samples and to do so in work environments other than a laboratory, consistent with or in accordance with the various embodiments described herein.

In the case of instructing or guiding users regarding how to perform experimental protocols or tests in a laboratory, a non-limiting example might involve the computing system identifying (by the techniques described herein) objects and instrumentation that is present in a laboratory. The computing system might generate and display image overlays (and perhaps also generate and present aural instructions) indicating what one or more objects or instrumentation in the laboratory are and what they might be used for, indicating how the one or more objects might be tested or used in laboratory tests or processes, indicating how the instrumentation is used to test samples, to prepare samples, or to perform other laboratory processes, and indicating other steps in the experimental protocols or tests, in some cases, with the use of highlighting fields, holographic arrows, still diagram montages, and/or moving or dynamic diagrams depicting each object, instrumentation, step, or process. Although a particular set of examples is described with respect to instructing or guiding users regarding how to perform experimental protocols or tests in a laboratory, the various embodiments are not so limited, and the AR assistance may be implemented to instruct or guide users regarding how to perform other procedures in a laboratory or to perform other tasks that are not based in a laboratory, consistent with or in accordance with the various embodiments described herein.

In the case of performing processes in a histology laboratory, a non-limiting example might involve the computing system identifying (by the techniques described herein) a tissue sample that arrives at a pathology laboratory. In the pathology laboratory, the tissue sample might be assigned a unique identifier and tests defined by the clinician or pathologist might be logged. The tissue sample and an appropriate cassette(s) that is(are) used to contain the tissue sample might be moved to grossing where a pathologist or technician wearing an AR headset might examine and document the tissue sample, might dictate (by using a microphone or other audio sensors, such as audio sensor(s) 175 of FIG. 1, or the like) his, her, or their observations, might select and size the tissue sample for submission to histology processes, and might place the tissue sample(s) in the identified cassette(s), all along aided, assisted, and/or guided by image overlays that are generated and displayed through the AR headset (which might also generate and present aural instructions). Next, a technician wearing an AR headset might be guided (via generated and displayed image overlays and/or generated and presented aural instructions through the AR headset) to move the identified cassette(s) to a processing station where the tissue sample might be fixed, dehydrated, and infiltrated in paraffin per the appropriate protocol for the type and size of that tissue sample. After processing, the technician might embed the tissue sample in paraffin to form a tissue block on a backside of the identified cassette(s). The computing system might generate and display image overlays (and perhaps also generate and present aural instructions) to guide the technician with any tissue sample-specific instructions determined from the grossing step or from standard protocol. The computing system might accept any sample-specific instructions that are needed for subsequent steps, such as the number of tissue slides required as dictated (via the microphone or other audio sensors, etc.) by the technician performing the embedding.

The computing system might document (via the front camera(s) 180 or 210a or 210b of FIG. 1 or 2, or the like) the face of the tissue block for subsequent quality control steps. Next, the technician might section the tissue block and might place the sections on appropriately identified microscope slides (or other sample containers). The technician may then add information to the system regarding how many slides were created and if any difficulties or issues were observed (such as insufficient tissue or the sample needed to be returned for additional processing). The computing system can compare the unique identifier for the block, the unique identifier for the microscope slide, the block face (or image thereof), and/or the tissue section(s) (or image(s) thereof) for consistency. Next, the technician might stain the slides per the correct assay, either by being guided (via the AR headset) through the chemical protocol, or by bringing the slides to the appropriate automated system that has the reagents and the capacity to proceed with the assay. After staining, the technician either might place the slides in the correct folder for delivery to a pathologist via the sorting process described above with respect to FIGS. 2A and 2B or might scan the slides for electronic delivery to the pathologist. The computing system might automatically compare the unique identifier for the slide and the image of the stained section to the original tissue block for consistency. The computing system can also be used to infer a sample location. For example, microscope slides are often grouped in baskets for automated processing. If a specific slide is placed in the basket with others, when one slide is identified in the basket at another location, the location of all other slides in that basket can be inferred even if the unique identifier for those other slides cannot be visually confirmed. Although a particular set of examples is described with respect to performing processes in a histology laboratory, the various embodiments are not so limited, and the AR assistance may be implemented in other ways to perform other tasks in a histology laboratory, consistent with or in accordance with the various embodiments described herein.

In the case of performing processes in a pathologist's office, a non-limiting example might involve the computing system identifying physical tissue samples that are delivered to the pathologist (e.g., by the techniques described herein—that is, by automatically reading or scanning the unique identifier (including, but not limited to, unique numerical identifier, unique alphanumeric identifier, unique symbolic identifier, unique 1D visual code (e.g., bar code, other 1D pattern, or the like), unique 2D visual code (e.g., QR code, other 2D pattern or matrix code, or the like), unique 3D visual code (e.g., 3D pattern code, 3D matrix code, 3D holographic code, 3D holographic pattern code, 3D holographic matrix code, or the like), or the like), or a digital image of at least a portion of the object itself or of a representative example of the object (e.g., digital image of at least a portion of a tissue sample or tissue section, etc.), on the ID tag of each physical tissue sample, or by automatically identifying a unique identifying feature or attribute of each physical tissue sample, or the like, as described herein). The computing system might then generate and display image overlays (and perhaps also generate and present aural instructions) presenting key information to the pathologist so that the pathologist can be assisted in identifying the most urgent samples to be diagnosed or the most efficient order to diagnose the presented samples. The computing system might also generate image overlays (and perhaps also generate and present aural instructions) guiding the pathologist to return each sample to the proper location (e.g., folder or other sample container, or the like) to ensure that no samples (whether disposed in microscope slides or other sample containers, etc.) are misplaced. In some cases, the image overlays might include use of highlighting fields, holographic arrows, still diagram montages, and/or moving or dynamic diagrams depicting the key information to the pathologist, the diagnosis procedures required, the steps for each diagnosis procedure, the order for performing the diagnoses, the locations for transfer of samples before, during, and after diagnosis, and so on. Although a particular set of examples is described with respect to performing processes in a pathologist's office, the various embodiments are not so limited, and the AR assistance may be implemented in other ways to perform other tasks in a pathologist's office, consistent with or in accordance with the various embodiments described herein.

In the case of performing tasks after slide diagnosis, a non-limiting example might involve the computing system identifying (by the techniques described herein) each sample or sample container (e.g., microscope slides containing the sample, or other sample containers containing the sample, or the like) after the samples have been diagnosed by a pathologist. The computing system might generate and display image overlays (and perhaps also generate and present aural instructions) to users or technicians wearing the AR headsets to retrieve these samples and to return them to the laboratory for storage, by guiding the users or technicians in placing the samples (in their sample containers) in numerical, alphabetical, or alphanumeric order for long term storage, as well as assisting the users or technicians in sorting (whether in numerical, alphabetical, or alphanumeric order, or the like) and storing the samples (e.g., tissue blocks or the like) for long term storage and subsequent (or future) retrieval, as necessary. In some cases, the image overlays might include use of highlighting fields, holographic arrows, still diagram montages, and/or moving or dynamic diagrams depicting identification information for each sample (or sample container), information to assist the users or technicians in the sorting tasks, information to assist the users or technicians in the storing tasks, and/or the like. Although a particular set of examples is described with respect to performing tasks after slide diagnosis, the various embodiments are not so limited, and the AR assistance may be implemented in other ways to perform tasks before or during slide diagnosis, consistent with or in accordance with the various embodiments described herein.

In the case of performing processes in a clinical or analytical laboratory, a non-limiting example might involve the computing system identifying (by the techniques described herein) a sample (including, but not limited to, a tube of blood, an aliquot from a pharmaceutical process, a field sample, a cell sample, or other sample to be analyzed) that has arrived at a clinical or analytical laboratory. The computing system might generate and display image overlays (and perhaps also generate and present aural instructions) to users or technicians wearing the AR headsets to guide the users or technicians to perform the current or next appropriate steps for the sample—including, but not limited to, placing the sample in an automated clinical chemistry system, placing the sample in a centrifuge, placing the sample in a mass spectrometer, or otherwise following a standard or specific protocol for preparing the sample for the next step(s) and for appropriately processing the sample. At each processing step, the computing system might generate and display image overlays (and perhaps also generate and present aural instructions) to guide the users or technicians to the next necessary step for that specific sample and to supply appropriate sample-specific information (that is either learned from the previous step or that is obtained at some other point), if needed. If the sample is split to different aliquots or changes in form, the additional tubes or processed sample forms are uniquely identified and those unique identifiers are associated with the original sample orders. With the generated image overlays, the users or technicians wearing the AR headsets can view the laboratory, and can clearly see or identify which samples are behind schedule, so that those samples can be expedited as their information viewed in the AR headsets may be tagged with a warning tag, a different color, or other distinguishing characteristics or marks. In some embodiments, the status of instrumentation may also be connected to the database to provide, via the AR headset (and associated image overlays and/or aural instructions), visual (and/or aural) status feedback to the users or technicians. Some exemplary (yet non-limiting) information might include, without limitation, "run complete," "run to be finished in X minutes," "error," "reagents required," "idle" or "standby," and/or the like. In some cases, the image overlays might include use of highlighting fields, holographic arrows, still diagram montages, and/or moving or dynamic diagrams depicting the transfer instructions indicated above, the next steps, the information regarding the sample, status or warning information, etc. Although a particular set of examples is described with respect to performing processes in a clinical or analytical laboratory, the various embodiments are not so limited, and the AR assistance may be implemented in other ways to perform other tasks in a clinical or analytical laboratory or to perform tasks in other work environments, consistent with or in accordance with the various embodiments described herein.

In the case of transferring reagents or samples, a non-limiting example might involve the computing system identifying (by the techniques described herein) all reagents or samples within a workspace (e.g., counter-top, table, tray, etc.) and/or identifying all transfer tubes, well-plates, or other containers within the workspace, etc. The computing system might generate and display image overlays (and perhaps also generate and present aural instructions) indicating which reagents or samples from which set or ones of tubes, well-plates, or other containers to transfer to which other set or ones of tubes, well-plates, or other containers. In some cases, different color coding overlays or different highlighting overlays, or the like, may be used to improve visual distinction between or among the various sets of tubes, well-plates, or other containers corresponding to the different reagents or samples, or the like. In this manner, the users or technicians, who are wearing the AR headsets, are better able to more quickly, more accurately, more precisely, and with more confidence transfer (in some cases, by pipetting, or by other means of transfer, or the like), reagents or samples into the designated tubes or well-plates (e.g., 96-, 384-, or 1536-well plates, or the like) even if the users or technicians are using multi-well pipettes or the like, while making fewer errors in the transfer of reagents or samples. In a similar manner, such AR-assisted transfer of reagents or samples may also be used to load reagents or samples into laboratory instrumentation or other sample loading platforms, thereby ensuring that the correct sample(s) is transferred to the correct inlets, sample lanes, or the like. In some cases, the user or technician might use voice input or the like (e.g., by using a microphone or other audio sensors, such as audio sensor(s) 175 of FIG. 1, or the like) to perform one or more of: changing or correcting the names of the reagents or samples; entering, changing, or updating other information about the reagents or samples (e.g., composition information, storage information, physician information, laboratory information, etc.); changing processes associated with transfer of the reagents or samples; changing processes associated with downstream processes involving the reagents or samples; etc. Although a particular set of examples is described with respect to transfer of reagents or samples, the various embodiments are not so limited, and the AR assistance may be implemented in other ways to transfer reagents or samples, consistent with or in accordance with the various embodiments described herein.

Although FIG. 2 describes the sorting of samples in microscope slides as an example of a task to be performed using AR-based assistance, the various embodiments are not so limited, and the AR-based assistance may be used to sort or otherwise process any or all of a variety of laboratory materials. For example, in some embodiments, AR-based assistance may be used for sorting or processing samples in sample containers that include, but are not limited to, at least one of microscope slides, cartridges, blocks, vials, tubes, capsules, flasks, vessels, receptacle, holders, repositories, canisters, microarrays, or microfluidic chips, and/or the like. In fact, the sample containers to be sorted or processed may comprise any other suitable type of carrier, container, or vehicle for any of a variety of solid, liquid, and/or gaseous materials, including, without limitation, biological samples (e.g., tissue samples, biomaterial samples, biological specimens, other biological samples, genomic samples, pharmaceutical samples, etc.), chemical samples (e.g., pharmaceutical samples, pharmacological samples, drug compounds, reagent samples, organic samples, inorganic samples, other chemical samples, etc.), environmental samples (e.g., soil samples, rock samples, stone samples, forensic samples, etc.), and/or the like.

These and other functions or features of the AR-based assistance implementation are described in greater detail above or below with respect to FIGS. 1, 3, and 4.

FIGS. 3A and 3B (collectively, "FIG. 3") are schematic diagrams illustrating a set of non-limiting examples 300 and 300' of sorting, categorizing, arranging, or organizing of objects performed by a plurality of users by utilizing AR headsets that are used for implementing AR-based assistance within a work environment, in accordance with various embodiments. FIG. 3A depicts a top view of an example 300 of a portion of a work environment in which sorting, categorizing, arranging, or organizing of objects is performed by a plurality of users 345 who utilize AR headsets 305 for implementing AR-based assistance within a work environment (only two users 345 are shown in FIG. 3 for simplicity of illustration, but the system may be implemented to accommodate any suitable number of users in any particular setting), while FIG. 3B depicts a non-limiting example 300' of a first user's perspective looking through an AR headset that is used for implementing AR-based assistance within a work environment as depicted in FIG. 3A. Sorting of slides by multiple users is described in greater detail in the '122 Application (which has already been incorporated herein by reference in its entirety for all purposes), in which "artificial reality" refers to "augmented reality" as described herein. Although the sorting, categorizing, arranging, or organizing of objects is shown in FIG. 3 as being a task that may be enhanced by the use of AR-based assistance or functionality as described herein, the various embodiments are not so limited, and the task that may be enhanced by the use of AR-based assistance or functionality may alternatively include, without limitation, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like (not shown), to be performed in corresponding one of a laboratory, a construction site, a machine shop, a workshop, a factory, or a room, and/or the like, where objects of interest within such work environments might include, but are not limited to, one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like.

According to some embodiments, examples 300 and 300' of FIGS. 3A and 3B might comprise AR headsets 305a and 305b worn by users 345a and 345b (respectively), one or more front or front-facing cameras 310a or 310b (collectively, "cameras 310" or "image capturing devices 310" or the like), one or more eye tracking sensors 315a or 315b (collectively, "eye tracking sensors 315" or "eye tracking cameras 315" or the like), light sources 375 mounted on each AR headset 305, and/or the like.

In the non-limiting examples 300 and 300' of FIGS. 3A and 3B, a table or counter 320 might be disposed within a work environment (in this case, a laboratory, or the like). On the table or counter 320 might be disposed a plurality of microscope slides 325 to be sorted, categorized, arranged, or organized as part of a task to be completed by a user, where each slide 325 might have affixed thereto an identifier or identification ("ID") tag 325a. In the non-limiting example of FIG. 3, each microscope slide 325 might contain a sample 330 for testing, cataloguing, or other laboratory or scientific purpose. As part of the task associated with the slides 325, each user 345 may be tasked with sorting, categorizing, arranging, or organizing the slides 325, which might involve placing particular slides (or sets/groups of slides) in particular trays 335 or containers 340 (each type of which, in some cases, may be stackable, as shown in FIG. 3B), each tray 335 or container 340 having an ID tag 335a or 340a, respectively, affixed thereto. In some cases, the table or counter 320 might also have an ID tag 320a affixed thereto.

In some instances, the ID tags 320a, 325a, 335a, and/or 340a might each comprise a unique identifier, which might include, without limitation, a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the object itself or of a representative example of the object (e.g., digital image of at least a portion of a tissue sample or tissue section, table, tray, container, instrumentation, tool, or other object, etc.), or a unique identifying feature or attribute (of an object among one or more objects 320, 325, 335, 340, etc.) (shown in FIG. 3), and/or the like. Alternatively, or additionally, at least one of the ID tags 320a, 325a, 335a, and/or 340a might each comprise a radio frequency identifier ("RFID") tag, or the like, that when interrogated by a radio frequency scanner (which may be disposed in the AR headset 305 (not shown in FIG. 3), or may be disposed within a dedicated RFID scanner or other similar device (not shown in FIG. 3)) would broadcast identification information (which might include the unique identifier data, or the like) in rf response signals. [This describes a passive RFID tag, although a battery-assisted passive RFID tag may be used. An active RFID tag that broadcasts its data without need of power from an interrogating signal from a rf scanner (in some cases, broadcasting constantly) could be used, but within the slide sorting, categorizing, arranging, or organization context, the computing system (such as described above with respect to FIG. 1) may be required to distinguish amongst the multitude of rf signals from the plurality of slides. A rf scanner having a narrow field of rf interrogation for interrogating passive or battery-assisted passive RFID tags within a limited area would avoid the problem inherent with active RFID tags for such a task. For other tasks that do not involve many RFID tags within a limited area, active RFID tags may function as well or better than passive or battery-assisted passive RFID tags. Alternatively, even for tasks that involve many RFID tags within a limited area (such as the slide sorting, categorizing, arranging, or organization of objects, etc.), the use of gaze focusing techniques as described below (i.e., tracking what the central portion of the field of view of the user to determine what the user is looking at) or the use of gestures by the user's hand(s) (i.e., having the user point directly at a particular object(s) having an RFID, or the like) or the use of gestures by a pointer or selection device(s) operated by the user, and/or the like, may serve as a trigger to filter out (in any generated image overlays) active RFID tag information associated with objects that are outside of these areas (i.e., outside of the central portion of the field of view of the user, outside the area where the user is pointing with the user's hand(s), or outside the area where the user is pointing using the pointer or selection device, etc.).] In some embodiments, a smart tag that combines RFID tag functionality with printed ID functionality (e.g., with use of barcodes or other 1D visual codes, QR codes or other 2D visual codes, 3D visual codes, numbers, letters, text, code, etc.) may also be used. Alternative, or additional, to the use of ID tags 320a, 325a, 335a, and/or 340a for identification of objects (such as the tables or counters 320, slides 325, the trays 335, or the containers 340, and/or the like), image recognition or photogrammetric recognition functionality (particularly as enhanced by use of an AI system or the like) may be used to perform, or aid in the performance of, identification of objects of interest among the objects.

With reference to FIG. 3B, AR-based assistance may be implemented (a non-limiting example 300' of which is shown in FIG. 3B). For instance, referring to FIG. 3B, a view of a portion of a work environment (in this case, a laboratory, or the like) is seen by a first user 345a through the AR headset 305a. In particular, the cameras 310a and/or 310b might capture an image(s) or video (collectively, "captured images" or the like) of the portion of the work environment (e.g., laboratory in this case, or the like). A computing system (such as at least one of the processor 150 of the first AR headset 115a, the computing system 105a, the remote computing system 105b, and/or the AI system 140 of FIG. 1, or the like, as described above) might receive the captured images from the cameras 310a and/or 310b, might analyze the captured images to identify one or more first objects among the objects present in the captured images of the work environment, might query a database (e.g., data store 155, database(s) 110a, and/or database(s) 110b of FIG. 1, or the like) to determine a first task associated with at least one first object among the identified one or more first objects, and might generate a first image overlay. In some embodiments, the first image overlay might provide at least one of a graphical icon-based instruction, a text-based instruction, an image-based instruction, or a highlighting-based instruction, and/or the like, each indicative of one or more instructions to be presented to the user to implement the first task associated with the at least one first object. The computing system might then display, to the eyes of the first user 345a through the AR headset 305a, the generated first image overlay that overlaps with the field of view of the eyes of the first user 345a. Turning to FIG. 3B, the first image overlay might include, but is not limited to, a first series of instructions 350, a second series of instructions 355, a third series of instructions 360, a fourth series of instructions 365, and/or the like.

In some embodiments, such as depicted in FIG. 3B, the first series of instructions 350 might include, without limitation, a highlighting-based field 350a that, when displayed in the first image overlay, appears to the user to surround a first slide 325 among the plurality of slides 325; an image of an arrow 350b that points from the first slide 325 to a particular slot within a first container 340 (denoted as "Folder 1" in FIG. 3B); and a hologram or image of a slide 350c fitting within the particular slot within first container 340; or the like. In a similar manner, the second series of instructions 355 might include, but is not limited to, a highlighting-based field 355a that covers a second slide 325 among the plurality of slides 325; an image of an arrow 355b that points from the second slide 325 to a particular indentation, cut-out, or bed within a tray 335 (denoted as "Tray 1" in FIG. 3B); and a highlighting-based field 355c that covers the particular indentation, cut-out, or bed within the particular tray 335; or the like. Likewise, the third series of instructions 360 might include, without limitation, a highlighting-based field 360a that, when displayed in the first image overlay, appears to the user to surround a third slide 325 (denoted as "Slide 109" in FIG. 3B) among the plurality of slides 325; an image of an arrow 360b that points from the third slide 325 to a particular slot within a third container 340 (denoted as "Folder 3" in FIG. 3B); and a highlighting-based field or image 360c outlining the bottom portion of the particular slot within third container 340; or the like. Similarly, the fourth series of instructions 365 might include, but is not limited to, a highlighting-based field 365a that covers a fourth slide 325 among the plurality of slides 325; an image of an arrow 365b that points from the fourth slide 325 to a particular indentation, cut-out, or bed within a tray 335 (denoted as "Tray 1" in FIG. 3B); and a highlighting-based field 365c that covers the particular indentation, cut-out, or bed within the particular tray 335; or the like. The first and second series of instructions 350 and 355 are intended for instructing the first user 345a to perform one or more tasks, while the third and fourth series of instructions 360 and 365 are intended for instructing the second user 345b to perform one or more other tasks. As shown in FIG. 3B, the first and second series of instructions 350 and 355 are depicted with a slash-type pattern, thereby distinguishing them from the third and fourth series of instructions 360 and 365, which are depicted with a textured pattern.

In some embodiments, rather than instructions, information may be displayed; for purposes of simplicity of description, however, such information is also referred to herein as instructions. For example, text-based tags 370 may be displayed, as an image overlay, beside or around some or all of relevant objects within the work environment. The text-based tags 370 might include, for instance, a slide-identifying text-based tag 370a (e.g., identifying "Slide 109" or the like), a container-identifying text-based tag 370b (e.g., identifying "Folder 1" or the like), another container-identifying text-based tag 370c (e.g., identifying "Folder 3" or the like), and a tray-identifying text-based tag 370d (e.g., identifying "Tray 1" or the like). According to some embodiments, the light source 375 might be used to highlight (using a collimated or focused beam of light) a focused portion of the work environment (such as a point at which the user 345 is looking at (which would serve as a cursor, reticle, or the like) or a point that the computing system highlights for the user to focus in on, or the like). Although particular examples of image overlays are illustrated in FIG. 3B, the various embodiments are not so limited, and any suitable type, shape, configuration, orientation, color, or size of image overlays may be used consistent with the embodiments described herein, with different types, shapes, configurations, orientations, colors, and/or sizes being displayed to represent responsibility by, or assignment to, the different users.

For multi-user slide sorting, the following four scenarios may arise, particularly, in the case of a two user situation: (1) each user has his or her own sets of slides and his or her own piles of folders; (2) each user has his or her own sets of slides, but work on the same piles of folders; (3) the users share common sets of slides and common piles of folders; and (4) the users share common sets of slides, but each have individual piles of folders; and/or the like. For situations involving more than two users, modifications may be made to these scenarios.

In the first scenario, each user sorts his, her, or their current pile into a single empty folder until a new folder is needed. If the user now has remaining slides that could go into another user's folder pile, that user is instructed to move those slides to the other user's loose slide region. Users continue to add new folders to their own pile(s) and to sort slides in their piles to their own folders. Slides that could be sorted into another user's pile are directed to be moved to the appropriate user's loose slide regions. If another user's top folder is within reach and the user has slides that can be placed there, the user can be instructed to place the slides in the other user's folder. The other user should be instructed to not add a new folder until these slides are placed. Alternatively, the user may be instructed to simply move the slides to the other user's loose slide region for the other user to sort. As each user adds more slides to his, her, or their slide region, each user is directed to add or move his, her, or their own folders around as appropriate, and to move slides to other user's regions as needed.

In the second scenario, on starting to sort, each user is instructed to add a new folder to different locations on the table. In the even that all slides from both users would go to a single folder, only one user is instructed to add a folder. Each user sorts from his, her, or their slides into any of the top folders. If both users have no more slides for any top folder, one or both users are instructed to add a new folder to the table, either on top of an existing folder, or in a new location depending on available space. All folder piles should be in reach of both users. When or if this is no longer possible, the user that has slides that cannot be placed within reach is instructed to move the appropriate slides to the other user's slide region (assuming that is within reach).

In the third scenario, the users would work in close proximity to each other. In the fourth scenario, each user might be instructed to add particular slides to his, her, or their own folder, while moving other slides to the other user's portion of the slide region.

Although FIG. 3, like FIG. 2, describes the sorting of samples in microscope slides as an example of a task to be performed using AR-based assistance, the various embodiments are not so limited, and the AR-based assistance may be used to sort or otherwise process any or all of a variety of laboratory materials. For example, in some embodiments, AR-based assistance may be used for sorting or processing samples in sample containers that include, but are not limited to, at least one of microscope slides, cartridges, blocks, vials, tubes, capsules, flasks, vessels, receptacle, holders, repositories, canisters, microarrays, or microfluidic chips, and/or the like. In fact, the sample containers to be sorted or processed may comprise any other suitable type of carrier, container, or vehicle for any of a variety of solid, liquid, and/or gaseous materials, including, without limitation, biological samples (e.g., tissue samples, biomaterial samples, biological specimens, other biological samples, genomic samples, pharmaceutical samples, etc.), chemical samples (e.g., pharmaceutical samples, pharmacological samples, drug compounds, reagent samples, organic samples, inorganic samples, other chemical samples, etc.), environmental samples (e.g., soil samples, rock samples, stone samples, forensic samples, etc.), and/or the like.

The AR-based assistance implementation and/or the image overlays of FIG. 3 might otherwise be similar, or identical, to the AR-based assistance implementation and/or the image overlays of FIGS. 1 and 2, or the like. These and other functions or features of the AR-based assistance implementation are described in greater detail above or below with respect to FIGS. 1, 2, and 4.

Figure 4A:
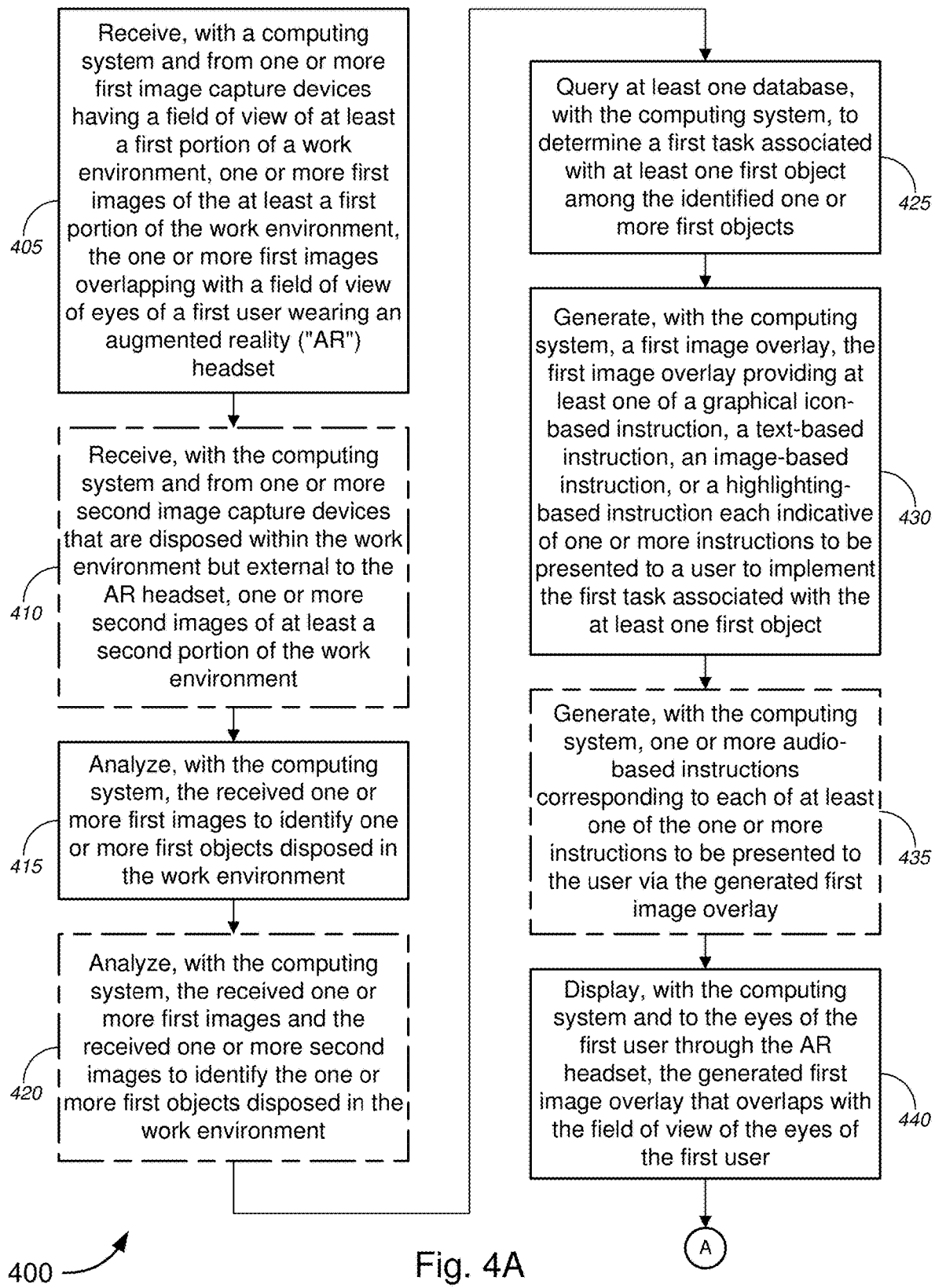
FIGS. 4A and 4B are flow diagrams illustrating a method for implementing AR-based assistance within a work environment, in accordance with various embodiments.
Figure 4B:
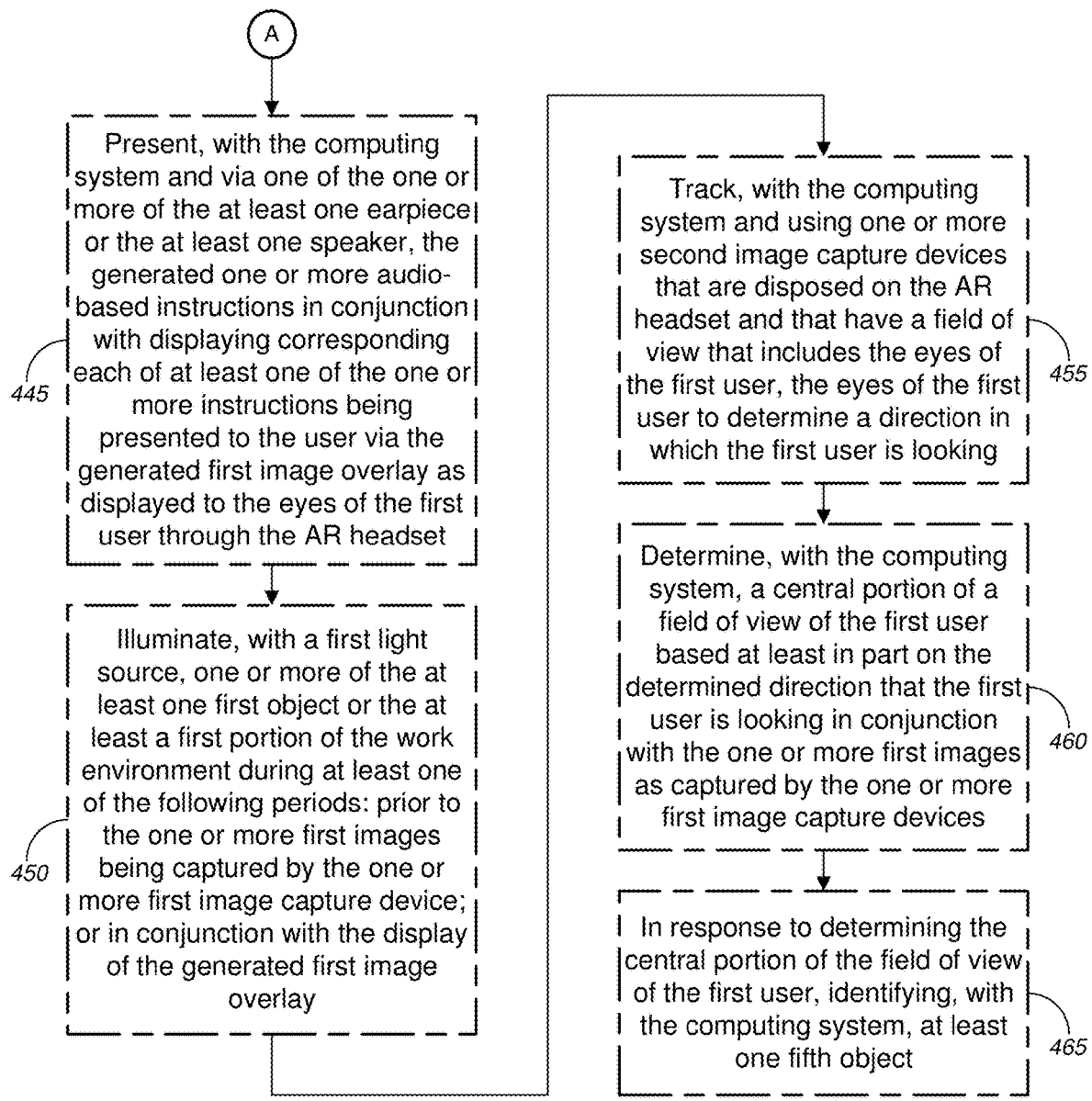

FIGS. 4A and 4B (collectively, "FIG. 4") are flow diagrams illustrating a method for implementing AR-based assistance within a work environment, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 300, and 300' of FIGS. 1, 2A, 2B, 3A, and 3B, respectively (or components thereof), such methods may also be implemented using any suitable hardware (or software) implementation. Similarly, while each of the systems, examples, or embodiments 100, 200, 200', 300, and 300' of FIGS. 1, 2A, 2B, 3A, and 3B, respectively (or components thereof), can operate according to the method 400 illustrated by FIG. 4 (e.g., by executing instructions embodied on a computer readable medium), the systems, examples, or embodiments 100, 200, 200', 300, and 300' of FIGS. 1, 2A, 2B, 3A, and 3B can each also operate according to other modes of operation and/or perform other suitable procedures.

In the non-limiting embodiment of FIG. 4A, method 400, at block 405, might comprise receiving, with a computing system and from one or more first image capture devices having a field of view of at least a first portion of a work environment (i.e., directed in front of an augmented reality ("AR") headset worn by a first user, or the like), one or more first images of the at least a first portion of the work environment, the one or more first images overlapping with a field of view of eyes of the first user wearing the AR headset. According to some embodiments, the computing system might include, without limitation, one of a processor disposed in the AR headset, a computing system disposed in the work environment, a remote computing system disposed external to the work environment and accessible over a network, or a cloud computing system, and/or the like. In some cases, the AR headset might include, but is not limited to, one of a set of AR goggles, a pair of AR-enabled eyewear, an AR-enabled smartphone mounted in a headset, or an AR helmet, and/or the like. In some instances, at least one of the one or more first image capture devices might be disposed on a portion of a housing of the AR headset.

At optional block 410, method 400 might comprise receiving, with the computing system and from one or more second image capture devices that are disposed within the work environment but external to the AR headset, one or more second images of at least a second portion of the work environment.

Method 400 might further comprise analyzing, with the computing system, the received one or more first images to identify one or more first objects disposed in the work environment (block 415). Method 400 might further comprise, at optional block 420, analyzing, with the computing system, the received one or more first images and the received one or more second images to identify the one or more first objects disposed in the work environment. At block 425, method 400 might comprise querying at least one database, with the computing system, to determine a first task associated with at least one first object among the identified one or more first objects. In some embodiments, the first task might include, without limitation, sorting, categorizing, arranging, or organizing the one or more first objects, wherein the one or more objects might include, but is not limited to, one or more microscope slides each containing a test sample or a tissue sample. In some cases, a plurality of users are tasked with performing the first task, wherein each user wears an AR headset that displays generated image overlays to each user that distinguishes objects that one user is intended to interact with from objects that the other users among the plurality of users are intended to interact with as part of the first task. Alternatively, the first task might include, without limitation, one of running a test sample or a tissue sample using laboratory instrumentation; assembling a piece of machinery; assembling an object; preparing a test sample or a tissue sample; identifying and/or tracking samples within a laboratory; instructing or guiding users regarding how to perform experimental protocols or tests in a laboratory; performing processes in a histology laboratory; performing processes in a pathologist's office; performing tasks after slide diagnosis; performing processes in a clinical or analytical laboratory; or transferring reagents or samples; and/or the like. In some cases, the one or more first objects might include, but is not limited to, one of laboratory instrumentation, laboratory tools, sample transfer devices, puzzle components or pieces, machinery parts, assembly tools, measurement tools, object parts, sample reagents, sample containers, burners, coolers, mixers, sample preparation tools, or sample transfer tools, and/or the like. In some cases, the work environment comprises one of a laboratory, a construction site, a machine shop, a workshop, a factory, or a room, and/or the like.

Method 400, at block 430, might comprise generating, with the computing system, a first image overlay, the first image overlay providing one or more instructions (which might include, without limitation, at least one of a graphical icon-based instruction, a text-based instruction, an image-based instruction, or a highlighting-based instruction, and/or the like) to be presented to a user to implement the first task associated with the at least one first object.

In some instances, the at least one of the graphical icon-based instruction, the text-based instruction, the image-based instruction, or the highlighting-based instruction might include, but is not limited to, at least one of a graphical icon-based instruction, a text-based instruction, an image-based instruction, or a highlighting-based instruction that, when displayed within the generated first image overlay, is superimposed over, displayed around, or displayed beside the at least one first object as viewed by the user through the AR headset, and/or the like. In some cases, the graphical icon-based instruction might include, without limitation, at least one of a graphical icon representing identification information associated with the at least one first object; a graphical icon representing identification information associated with a second object with which the at least one first object is intended to interact as part of the first task; a colored graphical icon distinguishing one first object from another first object among the at least one first object; a graphical icon comprising a directional arrow representing a direction that the at least one first object should be taken as part of the first task; or a colored graphical icon comprising a colored directional arrow distinguishing a first direction that the at least one first object should be taken as part of the first task from a second direction that a third object should be taken as part of the first task, and/or the like. In some instances, the text-based instruction might include, but is not limited to, at least one of a floating text window comprising textual instructions corresponding to the first task; or a surface text window that is superimposed on one of a table-top surface, a wall surface, or an object surface and that comprises textual instructions corresponding to the first task. In some cases, the floating text window, when displayed within the generated first image overlay, is displayed as a floating image beside the at least one first object or displayed as a floating image within the field of view of the eyes of the first user.

In some instances, the image-based instruction might include, without limitation, at least one of an image representing identification information associated with the at least one first object; an image representing identification information associated with a second object with which the at least one first object is intended to interact as part of the first task; an image comprising a directional arrow representing a direction that the at least one first object should be taken as part of the first task; an image comprising images of numbers or codes representing an order of processes of the first task associated with the at least one first object; a magnified image of the at least one first object; a three-dimensional ("3D") image or hologram; or an image of the at least one first object superimposed over a targeted portion of the work environment indicating at least one of position, orientation, or configuration of the at least one first object intended for placement at the targeted portion; and/or the like. In some cases, the highlighting-based instruction might include, but is not limited to, at least one of a highlighting field that, when displayed within the generated first image overlay, is superimposed over the at least one first object; a highlighting field that, when displayed within the generated first image overlay, is superimposed over a fourth object that is related to the first task associated with the at least one first object; or a highlighting field that, when displayed within the generated first image overlay, is superimposed over a targeted portion of the work environment indicated intended placement of the at least one first object at the targeted portion; and/or the like.

In some embodiments, the AR headset might include, without limitation, one or more of at least one earpiece or at least one speaker. In such cases, method 400 might further comprise generating, with the computing system, one or more audio-based instructions (which might include, but is not limited to, at least one of a tone, a series of tones, spoken instructions, or test-to-speech content, and/or the like) corresponding to each of at least one of the one or more instructions to be presented to the user via the generated first image overlay (optional block 435).

Method 400 might further comprise, at block 440, displaying, with the computing system and to the eyes of the first user through the AR headset, the generated first image overlay that overlaps with the field of view of the eyes of the first user. According to some embodiments, displaying the generated first image overlay to the eyes of the first user through the AR headset might include, but is not limited to, one of projecting the generated first image overlay directly in the eyes of the first user, projecting the generated first image overlay on a projection plane or surface in front of the eyes of the first user, projecting the generated first image overlay as a hologram in front of the eyes of the first user, displaying the generated first image overlay on a transparent or semi-transparent display screen of the AR headset that is disposed in front of the eyes of the first user, or displaying the generated first image overlay superimposed over a continuous video recording and display on a display screen of an AR-enabled smartphone mounted in the AR headset, and/or the like. Method 400 might continue onto the process at optional block 445 in FIG. 4B following the circular marker denoted, "A."

At optional block 445 in FIG. 4B (following the circular marker denoted, "A"), method 400 might comprise presenting, with the computing system and via one of the one or more of the at least one earpiece or the at least one speaker, the generated one or more audio-based instructions in conjunction with displaying corresponding each of at least one of the one or more instructions being presented to the user via the generated first image overlay as displayed to the eyes of the first user through the AR headset.

Method 400 might further comprise, at optional block 450, illuminating, with a first light source, one or more of the at least one first object or the at least a first portion of the work environment during at least one of the following periods: prior to the one or more first images being captured by the one or more first image capture device; or in conjunction with the display of the generated first image overlay. In some cases, the first light source might be disposed on a portion of the AR headset.

Method 400 might comprise, at optional block 455, tracking, with the computing system and using one or more second image capture devices that are disposed on the AR headset and that have a field of view that includes the eyes of the first user (i.e., that are directed at the eyes of the first user, or the like), the eyes of the first user to determine a direction in which the first user is looking. Method 400 might further comprise determining, with the computing system, a central portion of a field of view of the first user (i.e., determining what the first user is looking at, or the like) based at least in part on the determined direction that the first user is looking in conjunction with the one or more first images as captured by the one or more first image capture devices (optional 460). At optional block 465, method 400 might comprise, in response to determining the central portion of the field of view of the first user (i.e., determining what the first user is looking at, or the like), identifying, with the computing system, at least one fifth object.

Exemplary System and Hardware Implementation

Figure 5:
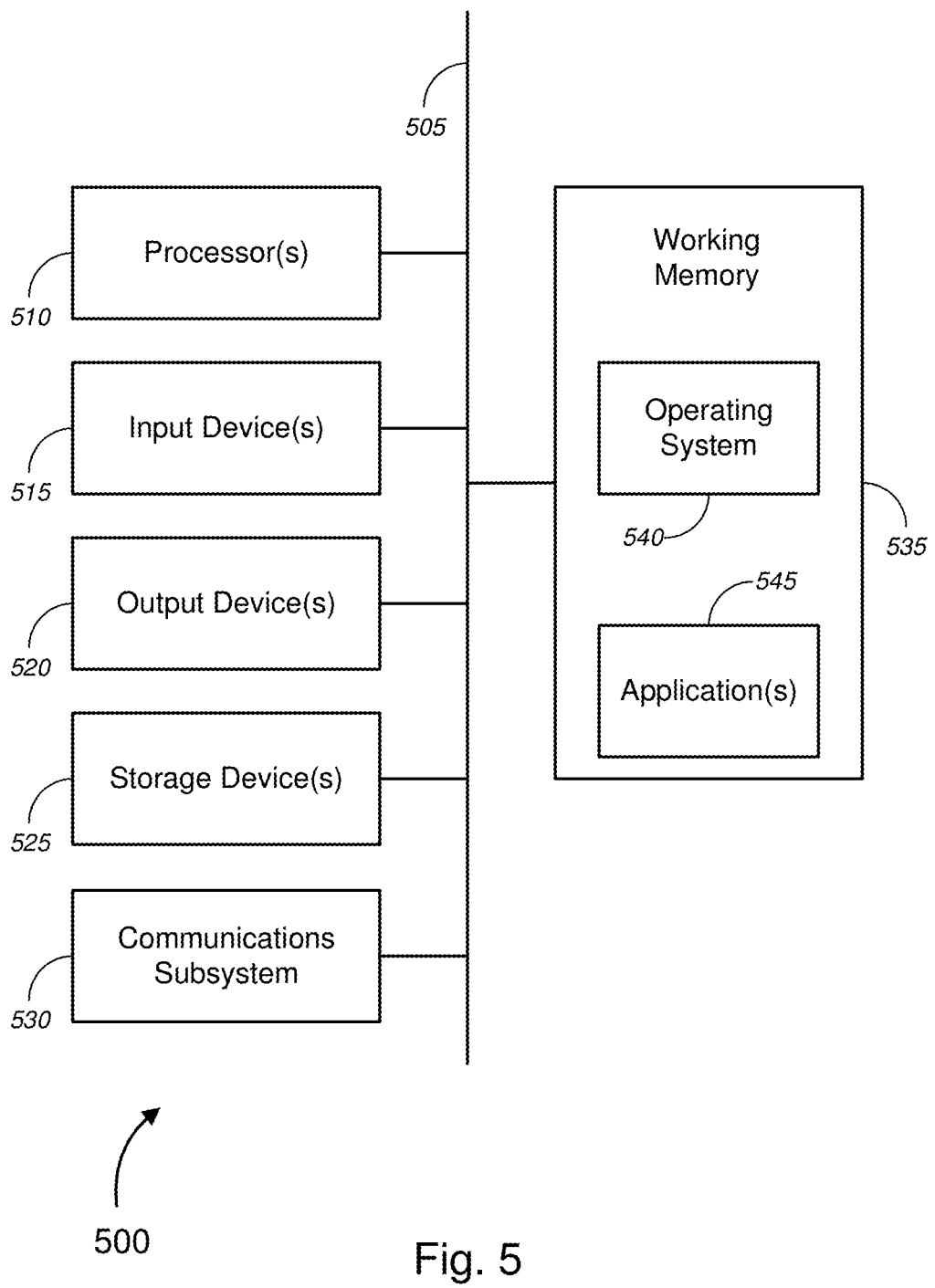
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105*a* and 105*b*, augmented reality ("AR") headsets 115*a*-115*n*, 205, 305*a*, and 305*b*, and artificial intelligence ("AI") system 140, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105*a* and 105*b*, AR headsets 115*a*-115*n*, 205, 305*a*, and 305*b*, and AI system 140, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
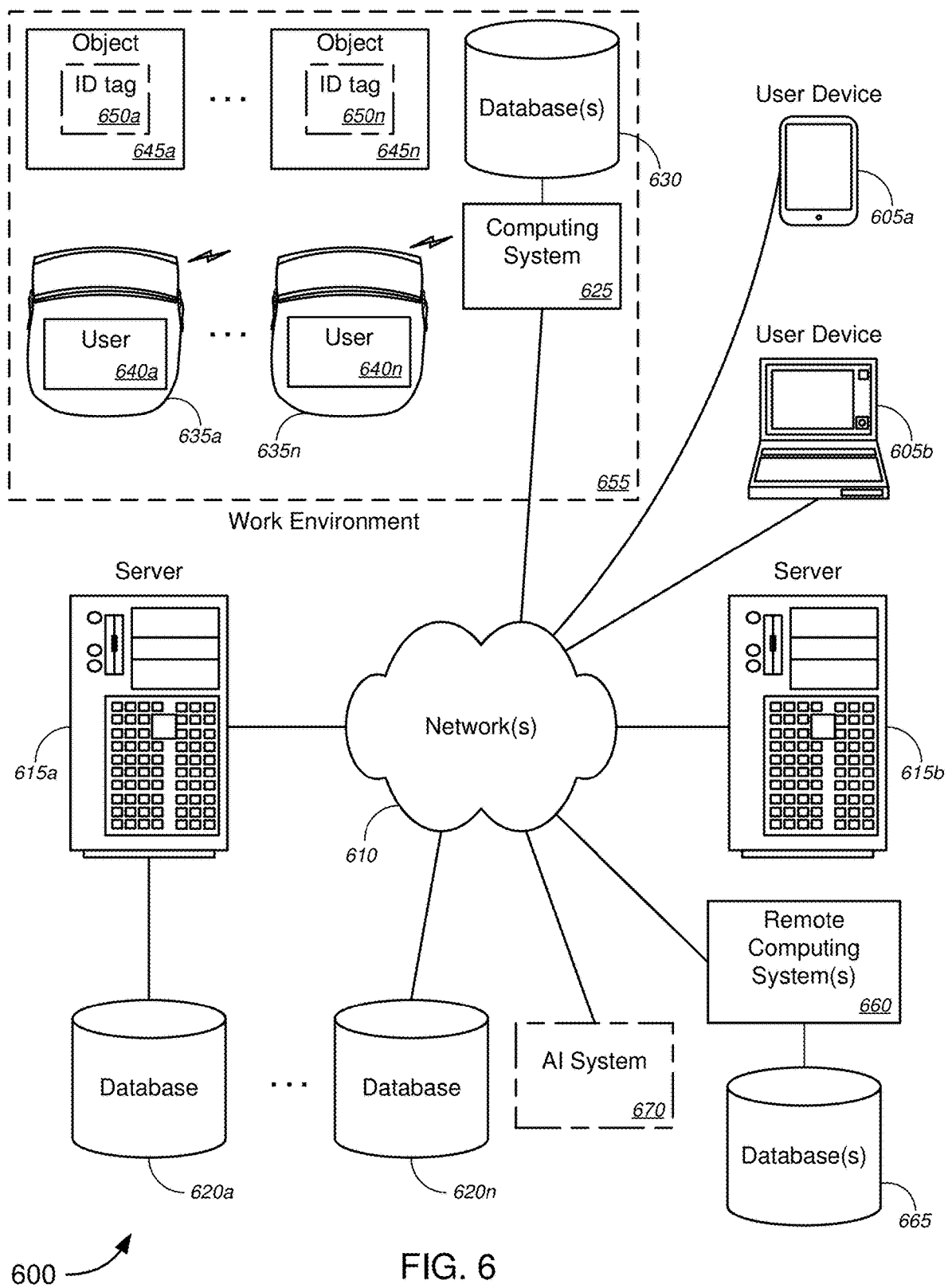
FIG. 6 is a block diagram illustrating a networked system of computers, computing systems, or system hardware architecture, which can be used in accordance with various embodiments.

As noted above, a set of embodiments comprises methods and systems for implementing assistance within a work environment, and, more particularly, to methods, systems, and apparatuses for implementing augmented reality (AR)-based assistance within a work environment. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 145 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing assistance within a work environment, and, more particularly, to methods, systems, and apparatuses for implementing augmented reality (AR)-based assistance within a work environment, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625 and corresponding database(s) 630 (similar to computing system 105a and corresponding database(s) 110a of FIG. 1, or the like), one or more augmented reality ("AR") headsets 635a-635n (collectively, "AR headsets 635" or the like; similar to AR headsets 115a-115n, 205, 305a, and 305b of FIGS. 1-3, or the like) that are worn or wearable by one or more users 640a-640n (collectively, "users 640" or the like; similar to users 120a-120n, 345a, or 345b of FIGS. 1 and 3A, or the like). In some cases, the AR headset might include, but is not limited to, one of a set of AR goggles, a pair of AR-enabled eyewear, an AR-enabled smartphone mounted in a headset, or an AR helmet, and/or the like. In some embodiments, system 600 might comprise one or more objects 645a-645n (collectively, "objects 645" or the like; similar to objects 125a-125n, 220, 225, 235, 240, 320, 325, 335, and 340 of FIGS. 1-3, or the like); in some cases, objects 645 might comprise identifier or identification ("ID") tags 650 (optional; similar to ID tags 130a-130n, 220a, 225a, 235a, 240a, 320a, 325a, 335a, and 340a of FIGS. 1-3, or the like) affixed thereto (the ID tags 650 comprising tags 650a-650n, or the like, each affixed to one of the objects 645). In some instances, the ID tags 650 might comprise a unique identifier, which might include, without limitation, a unique numerical identifier, a unique alphanumeric identifier, a unique symbolic identifier, a unique one-dimensional ("1D") visual code (including, but not limited to, a unique bar code, or other unique 1D pattern code, or the like), a unique two-dimensional ("2D") visual code (including, but not limited to, a unique quick response ("QR") code, or other unique 2D pattern or matrix code, or the like), a unique three-dimensional ("3D") visual code (including, but not limited to, a unique 3D pattern code, a unique 3D matrix code, a unique 3D holographic code, a unique 3D holographic pattern code, a unique 3D holographic matrix code, or the like), a digital image of at least a portion of the object 645 itself or of a representative example of the object 645 (e.g., digital image of at least a portion of a tissue sample or tissue section, table, tray, container, instrumentation, tool, or other object, etc.), or a unique identifying feature or attribute (of an object among the one or more objects 645), and/or the like. Alternatively, or additionally, at least one of the ID tags 650 might comprise a radio frequency identifier ("RFID") tag, or the like, that when interrogated by a radio frequency scanner (which may be disposed in the AR headset 635, such as transceiver 190 of FIG. 1 or other component (not shown), or may be disposed within a dedicated RFID scanner or other similar device (not shown)) would broadcast identification information (which might include the unique identifier data, or the like) in rf response signals. In some embodiments, a smart tag that combines RFID tag functionality with printed ID functionality (e.g., with use of barcodes or other 1D visual codes, QR codes or other 2D visual codes, 3D visual codes, numbers, letters, text, code, etc.) may also be used. Alternative, or additional, to the ID tags 650, image recognition or photogrammetric recognition functionality (particularly as enhanced by use of AI system 670 or the like) may be used to perform, or aid in the performance of, identification of objects of interest among the objects 645. The computing system 625, the database(s) 630, the AR goggles 635a-635n that are worn or wearable by respective users 640a-640n, and the objects 645a-645n, or the like, might be disposed in work environment 655, which might include, but is not limited to, one of a laboratory, a construction site, a machine shop, a workshop, a factory, or a room, and/or the like.

System 600 might further comprise an artificial intelligence ("AI") system 670 (optional; similar to AI system 140 of FIG. 1, or the like) that might communicatively couple to computing system 625 via network(s) 610. According to some embodiments, alternative or additional to the computing system 625 and corresponding database 630 being disposed within work environment 655, system 600 might comprise remote computing system 660 (optional; similar to remote computing system 105b of FIG. 1, or the like) and corresponding database(s) 665 (optional; similar to database(s) 110b of FIG. 1, or the like) that communicatively couple with at least one of the one or more AR headsets 635a-635n in the work environment 655 via the one or more networks 610. According to some embodiments, computing system 625 might include, without limitation, one of a processor disposed in the AR headset, or a computing system disposed in the work environment, and/or the like. In some cases, remote computing system 660 might include, but is not limited to, at least one of a remote computing system disposed external to the work environment and accessible over a network, or a cloud computing system, and/or the like. The AI system 670 might be used to facilitate operation by computing system 625, computing system 660, and/or at least one AR headset 635.

In operation, at least one of the front camera(s) (e.g., front camera(s) 180 of FIG. 1, or the like) of a first AR headset 635a and/or the front camera(s) of one or more other AR headsets 635b-635n (collectively, "image capture device(s)" or "camera(s)" or the like) might capture images or video of at least a first portion of work environment 655. In some cases, (particularly, with the images or videos captured by the front camera(s) of the first AR headset 635a) the captured images or video might overlap with a field of view of the eyes of the first user 640a wearing the first AR headset 635a. The image capture device(s) might subsequently send the captured images or video. At least one of the first AR headset 635a, the computing system 625, the remote computing system 660, and/or the AI system 670 (collectively, "the computing system" or the like) might receive the captured images or video (collectively, "captured images" or the like) from the image capture device(s), might analyze the received captured images to identify one or more first objects 645 among the one or more objects 645a-645n, might query at least one database (e.g., database(s) 630 and/or database(s) 665, or the like) to determine a first task associated with at least one first object among the identified one or more first objects 645, and might generate a first image overlay. In some embodiments, the first image overlay might provide at least one of a graphical icon-based instruction, a text-based instruction, an image-based instruction, or a highlighting-based instruction, and/or the like, each indicative of one or more instructions to be presented to first user 640a to implement the first task associated with the at least one first object 645. The computing system might then display, to the eyes of the first user 640a through the AR headset, the generated first image overlay that overlaps with the field of view of the eyes of the first user 640a.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system and from one or more first image capture devices having a field of view of at least a first portion of a work environment, one or more first images of the at least the first portion of the work environment, the one or more first images overlapping with a field of view of eyes of a first user wearing an augmented reality ("AR") headset;
analyzing, with the computing system, the received one or more first images to identify one or more first objects disposed in the work environment, wherein the one or more first objects each comprises a radio frequency identifier ("RFID") tag affixed thereto, and wherein to identify the one or more first objects comprises:
identifying the one or more first objects based on the RFID tag affixed to each first object in conjunction with identifying the one or more first objects based on analysis of the received one or more first images; and
filtering, based on a gesture or a selection by the first user, RFID tag information associated with objects outside of a central portion of the field of view of the first user or outside of an area defined by the gesture or the selection by the first user;
querying at least one database, with the computing system, to determine a first task associated with at least one first object among the identified one or more first objects, wherein the first task comprises sorting, categorizing, arranging, or organizing the one or more first objects, wherein the one or more first objects comprise one or more microscope slides each containing a test sample or a tissue sample, wherein the first task further comprises one of performing processes in a histology laboratory or performing processes in a pathologist's office, and wherein the first task further comprises a plurality of steps associated with each particular type of task;
generating, with the computing system, a first image overlay, the first image overlay providing at least one of a graphical icon-based instruction, a text-based instruction, an image-based instruction, or a highlighting-based instruction each indicative of one or more instructions to be presented to the first user to implement each of the plurality of steps of the sorting, categorizing, arranging, or organizing of the one or more microscope slides containing the test or tissue samples;
displaying, with the computing system and to the eyes of the first user through the AR headset, the generated first image overlay that overlaps with the field of view of the eyes of the first user;
tracking, with the computing system and using one or more second image capture devices that are disposed on the AR headset and that have a field of view that includes the eyes of the first user, the eyes of the first user to determine a direction in which the first user is looking;
determining, with the computing system, the central portion of the field of view of the first user based at least in part on the determined direction that the first user is looking in conjunction with the one or more first images as captured by the one or more first image capture devices; and
selecting the at least one first object based on an analysis of the central portion of the field of view of the first user and a verbal instruction by the first user to focus on the at least one first object;
wherein the plurality of steps comprises:
identifying particular one or more objects for the first user to interact with;
identifying specific task-related step-by-step interactions, actuations, movements, transfers, or placements of the identified particular one or more objects for one of performing processes in the histology laboratory or performing processes in the pathologist's office; and
identifying specific timings or sequences for each identified specific task-related step-by-step interaction, actuation, movement, transfer, or placement of the identified particular one or more objects for accomplishing the one of performing processes in the histology laboratory or performing processes in the pathologist's office;
wherein, where the particular one or more objects include instrumentation or equipment, the plurality of steps further comprises:
identifying a model of the instrumentation or equipment for performing at least a portion of the one of performing processes in the histology laboratory or performing processes in the pathologist's office; and
accessing documentation of the identified model of the instrumentation or equipment in response to user selection of operation of the instrumentation or equipment;
wherein identifying specific task-related step-by-step interactions, actuations, movements, transfers, or placements of the identified particular one or more objects comprises identifying specific task-related step-by-step interactions, actuations, movements, transfers, or placements of the identified model of the instrumentation or equipment based on information in the accessed documentation and based on the user selection of operation of the instrumentation or equipment for performing the at least the portion of the one of performing processes in the histology laboratory or performing processes in the pathologist's office; and
wherein the generated first image overlay comprises one or more image overlays of data corresponding to at least
the identified particular one or more objects,
the identified specific task-related step-by-step interactions, actuations, movements, transfers, or placements of the identified particular one or more objects, and
the identified specific timings or sequences for each identified specific task-related step-by-step interaction, actuation, movement, transfer, or placement of the identified particular one or more objects for accomplishing the one of performing processes in the histology laboratory or performing processes in the pathologist's office.

2. A method, comprising:
receiving, with a computing system and from one or more first image capture devices having a field of view of at least a first portion of a work environment, one or more first images of the at least the first portion of the work environment, the one or more first images overlapping with a field of view of eyes of a first user wearing an augmented reality ("AR") headset;

analyzing, with the computing system, the received one or more first images to identify one or more first objects disposed in the work environment, wherein the one or more first objects each comprises a radio frequency identifier ("RFID") tag affixed thereto, and wherein to identify the one or more first objects comprises:

identifying the one or more first objects based on the RFID tag affixed to each first object in conjunction with identifying the one or more first objects based on analysis of the received one or more first images; and filtering, based on a gesture or a selection by the first user, RFID tag information associated with objects outside of a central portion of the field of view of the first user or outside of an area defined by the gesture or the selection by the first user;

querying at least one database, with the computing system, to determine a first task associated with at least one first object among the identified one or more first objects, wherein the first task comprises one of performing processes in a histology laboratory or performing processes in a pathologist's office, and wherein the first task further comprises a plurality of steps associated with each particular type of task;

generating, with the computing system, a first image overlay, the first image overlay providing one or more instructions to be presented to the first user to implement each of the plurality of steps of the first task associated with the at least one first object; and displaying, with the computing system and to the eyes of the first user through the AR headset, the generated first image overlay that overlaps with the field of view of the eyes of the first user;

wherein the plurality of steps comprises:

identifying particular one or more objects for the first user to interact with;

identifying specific task-related step-by-step interactions, actuations, movements, transfers, or placements of the identified particular one or more objects for one of performing processes in the histology laboratory or performing processes in the pathologist's office; and identifying specific timings and sequences for each identified specific task-related step-by-step interaction, actuation, movement, transfer, or placement of the identified particular one or more objects for accomplishing the one of performing processes in the histology laboratory or performing processes in the pathologist's office;

wherein, where the particular one or more objects include instrumentation or equipment, the plurality of steps further comprises:

identifying a model of the instrumentation or equipment for performing at least a portion of the one of performing processes in the histology laboratory, or performing processes in the pathologist's office; and accessing documentation of the identified model of the instrumentation or equipment in response to user selection of operation of the instrumentation or equipment;

wherein identifying specific task-related step-by-step interactions, actuations, movements, transfers, or placements of the identified particular one or more objects comprises identifying specific task-related step-by-step interactions, actuations, movements, transfers, or placements of the identified model of the instrumentation or equipment based on information in the accessed documentation and based on the user selection of operation of the instrumentation or equipment for performing the at least the portion of the one of performing processes in the histology laboratory or performing processes in the pathologist's office;

wherein the generated first image overlay comprises one or more image overlays of data corresponding to at least the identified particular one or more objects, the identified specific task-related step-by-step interactions, actuations, movements, transfers, or placements of the identified particular one or more objects, and the identified specific timings and sequences for each identified specific task-related step-by-step interaction, actuation, movement, transfer, or placement of the identified particular one or more objects for accomplishing the one of performing processes in the histology laboratory or performing processes in the pathologist's office.

3. The method of claim 2, wherein the computing system comprises one of a processor disposed in the AR headset, another computing system being disposed in the work environment, a remote computing system disposed external to the work environment and accessible over a network, or a cloud computing system.

4. The method of claim 2, wherein the AR headset comprises one of a set of AR goggles, a pair of AR-enabled eyewear, an AR-enabled smartphone mounted in a headset, or an AR helmet.

5. The method of claim 2, wherein the AR headset comprises one or more of at least one earpiece or at least one speaker, wherein the method further comprises:

generating, with the computing system, one or more audio-based instructions corresponding to each of at least one of the one or more instructions to be presented to the user via the generated first image overlay; and presenting, with the computing system and via one of the one or more of the at least one earpiece or the at least one speaker, the generated one or more audio-based instructions in conjunction with displaying corresponding each of at least one of the one or more instructions being presented to the user via the generated first image overlay as displayed to the eyes of the first user through the AR headset.

6. The method of claim 2, wherein displaying the generated first image overlay to the eyes of the first user through the AR headset comprises one of projecting the generated first image overlay directly in the eyes of the first user, projecting the generated first image overlay on a projection plane or surface in front of the eyes of the first user, projecting the generated first image overlay as a hologram in front of the eyes of the first user, displaying the generated first image overlay on a transparent or semi-transparent display screen of the AR headset that is disposed in front of the eyes of the first user, or displaying the generated first image overlay superimposed over a continuous video recording and display on a display screen of an AR-enabled smartphone mounted in the AR headset.

7. The method of claim 2, wherein at least one of the one or more first image capture devices is disposed on a portion of a housing of the AR headset.

8. The method of claim 2, further comprising:
receiving, with the computing system and from one or more second image capture devices that are disposed within the work environment but external to the AR headset, one or more second images of at least a second portion of the work environment;
wherein analyzing, with the computing system, the received one or more first images to identify one or more first objects disposed in the work environment comprises analyzing, with the computing system, the received one or more first images and the received one or more second images to identify the one or more first objects disposed in the work environment.

9. The method of claim 2, wherein at least one of the one or more instructions, when displayed within the generated first image overlay, is superimposed over, displayed around, or displayed beside the at least one first object as viewed by the first user through the AR headset.

10. The method of claim 9, wherein the at least one of the one or more instructions comprises at least one of a graphical icon-based instruction, a text-based instruction, an image-based instruction, or a highlighting-based instruction.

11. The method of claim 10, wherein:
the graphical icon-based instruction comprises at least one of a graphical icon representing identification information associated with the at least one first object, a graphical icon representing identification information associated with a second object with which the at least one first object is intended to interact as part of the first task, a colored graphical icon distinguishing one first object from another first object among the at least one first object, a graphical icon comprising a directional arrow representing a direction that the at least one first object should be taken as part of the first task, or a colored graphical icon comprising a colored directional arrow distinguishing a first direction that the at least one first object should be taken as part of the first task from a second direction that a third object should be taken as part of the first task;
the text-based instruction comprises at least one of a floating text window comprising textual instructions corresponding to the first task or a surface text window that is superimposed on one of a table-top surface, a wall surface, or an object surface and that comprises textual instructions corresponding to the first task, wherein the floating text window, when displayed within the generated first image overlay, is displayed as a floating image beside the at least one first object or displayed as a floating image within the field of view of the eyes of the first user;
the image-based instruction comprises at least one of an image representing identification information associated with the at least one first object, an image representing identification information associated with the second object with which the at least one first object is intended to interact as part of the first task, an image comprising the directional arrow representing the direction that the at least one first object should be taken as part of the first task, an image comprising images of numbers or codes representing an order of processes of the first task associated with the at least one first object, a magnified image of the at least one first object, a three-dimensional ("3D") image or hologram, or an image of the at least one first object superimposed over a targeted portion of the work environment indicating at least one of position, orientation, or configuration of the at least one first object intended for placement at the targeted portion; and
the highlighting-based instruction comprises at least one of a highlighting field that, when displayed within the generated first image overlay, is superimposed over the at least one first object, a highlighting field that, when displayed within the generated first image overlay, is superimposed over a fourth object that is related to the first task associated with the at least one first object, or a highlighting field that, when displayed within the generated first image overlay, is superimposed over the targeted portion of the work environment indicating intended placement of the at least one first object at the targeted portion.

12. The method of claim 2, wherein the one or more first objects each comprises a unique identifier, wherein the unique identifier comprises a unique numerical identifier, a unique alphanumeric identifier, a unique symbolic identifier, a unique one-dimensional ("1D") visual code, a unique two-dimensional ("2D") visual code, a unique three-dimensional ("3D") visual code, a digital image of at least a portion of the first object itself or of a representative example of the first object, or a unique identifying feature or attribute, wherein analyzing, with the computing system, the received one or more first images to identify one or more first objects disposed in the work environment comprises identifying, with the computing system, the unique identifier that is associated with each of the one or more first objects and that is displayed on at least a portion of each of the one or more first objects.

13. The method of claim 2, further comprising:
illuminating, with a first light source, one or more of the at least one first object or the at least the first portion of the work environment during at least one of the following periods: prior to the one or more first images being captured by the one or more first image capture devices; or conjunction with the display of the generated first image overlay.

14. The method of claim 13, wherein the first light source is disposed on a portion of the AR headset.

15. The method of claim 2, further comprising:
tracking, with the computing system and using one or more second image capture devices that are disposed on the AR headset and that have a field of view that includes the eyes of the first user, the eyes of the first user to determine a direction in which the first user is looking; and
determining, with the computing system, the central portion of the field of view of the first user based at least in part on the determined direction that the first user is looking in conjunction with the one or more first images as captured by the one or more first image capture devices.

16. The method of claim 15, further comprising:
in response to determining the central portion of the field of view of the first user, identifying, with the computing system, at least one further object.

17. The method of claim 2, wherein the first task further comprises sorting, categorizing, arranging, or organizing the one or more first objects, wherein the one or more objects comprise one or more microscope slides each containing a test sample or a tissue sample.

18. The method of claim 2, wherein the one or more first objects comprises one of laboratory instrumentation, laboratory tools, sample transfer devices, puzzle components or pieces, sample reagents, sample containers, burners, coolers, mixers, sample preparation tools, or sample transfer tools.

19. The method of claim 2, wherein a plurality of users is tasked with performing the first task, wherein each user of the plurality of users wears an AR headset that displays generated image overlays to each user that distinguishes objects that one user is intended to interact with from objects that other users among the plurality of users are intended to interact with as part of the first task.

20. The method of claim 2, wherein the work environment comprises one of a laboratory, a construction site, a machine shop, a workshop, a factory, or a room.

21. The method of claim 2, further comprising:
inferring a location of a plurality of objects based on placement of the identified particular one or more objects adjacent to the plurality of objects.

22. A system, comprising:
a computing system, comprising:
at least one processor; and
a non-transitory computer readable medium communicatively coupled to the at least one processor, the non-transitory computer readable medium having stored thereon computer software comprising a set of instructions that, when executed by the at least one processor, causes the computing system to:
receive, from one or more first image capture devices having a field of view of at least a first portion of a work environment, one or more first images of the at least the first portion of the work environment, the one or more first images overlapping with a field of view of eyes of a first user wearing an augmented reality ("AR") headset;
analyze the received one or more first images to identify one or more first objects disposed in the work environment, wherein the one or more first objects each comprises a radio frequency identifier ("RFID") tag affixed thereto, and wherein to identify the one or more first objects comprises:
identifying the one or more first objects based on the RFID tag affixed to each first object in conjunction with identifying the one or more first objects based on analysis of the received one or more first images; and
filtering, based on a gesture or a selection by the first user, RFID tag information associated with objects outside of a central portion of the field of view of the first user or outside of an area defined by the gesture or the selection by the first user;
query at least one database to determine a first task associated with at least one first object among the identified one or more first objects, wherein the first task comprises one of performing processes in a histology laboratory or performing processes in a pathologist's office, and wherein the first task further comprises a plurality of steps associated with each particular type of task;
generate a first image overlay, the first image overlay providing one or more instructions to be presented to the first user to implement each of the plurality of steps of the first task associated with the at least one first object; and
display, to the eyes of the first user through the AR headset, the generated first image overlay that overlaps with the field of view of the eyes of the first user;
wherein the plurality of steps comprises:
identifying particular one or more objects for the first user to interact with;
identifying specific task-related step-by-step interactions, actuations, movements, transfers, or placements of the identified particular one or more objects for one of performing processes in the histology laboratory or performing processes in the pathologist's office; and
identifying specific timings or sequences for each identified specific task-related step-by-step interaction, actuation, movement, transfer, or placement of the identified particular one or more objects for accomplishing the one of performing processes in the histology laboratory or performing processes in the pathologist's office;
wherein, where the particular one or more objects include instrumentation or equipment, the plurality of steps further comprises:
identifying a model of the instrumentation or equipment for performing at least a portion of the one of performing processes in the histology laboratory or performing processes in the pathologist's office; and
accessing documentation of the identified model of the instrumentation or equipment in response to user selection of operation of the instrumentation or equipment;
wherein identifying specific task-related step-by-step interactions, actuations, movements, transfers, or placements of the identified particular one or more objects comprises identifying specific task-related step-by-step interactions, actuations, movements, transfers, or placements of the identified model of the instrumentation or equipment based on information in the accessed documentation and based on the user selection of operation of the instrumentation or equipment for performing the at least the portion of the one of performing processes in the histology laboratory or performing processes in the pathologist's office; and
wherein the generated first image overlay comprises one or more image overlays of data corresponding to at least
the identified particular one or more objects,
the identified specific task-related step-by-step interactions, actuations, movements, transfers, or placements of the identified particular one or more objects,
the identified specific timings or sequences for each identified specific task-related step-by-step interaction, actuation, movement, transfer, or placement of the identified particular one or more objects for accomplishing the one of performing processes in the histology laboratory or performing processes in the pathologist's office, and
an expected wait time of availability of the instrumentation or equipment for the first user based on monitoring of use of the instrumentation or equipment by other users.

23. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive, from one or more first image capture devices having a field of view of at least a first portion of a work environment, one or more first images of the at least the first portion of the work environment, the one or more first images overlapping with a field of view of eyes of a first user wearing an augmented reality ("AR") headset;
analyze the received one or more first images to identify one or more first objects disposed in the work environment;
    query at least one database to determine a first task associated with at least one first object among the identified one or more first objects, wherein the first task comprises one of performing processes in a histology laboratory or performing processes in a pathologist's office, and wherein the first task further comprises a plurality of steps associated with each particular type of task;
    generate a first image overlay, the first image overlay providing one or more instructions to be presented to the first user to implement each of the plurality of steps of the first task associated with the at least one first object; and
    display, to the eyes of the first user through the AR headset, the generated first image overlay that overlaps with the field of view of the eyes of the first user;
wherein the plurality of steps comprises:
    identifying particular one or more objects for the first user to interact with;
    identifying specific task-related step-by-step interactions, actuations, movements, or transfers, and placements, based on meeting of a specified percentage condition of usage that includes partial usage, of the identified particular one or more objects for one of performing processes in the histology laboratory or performing processes in the pathologist's office; and
    identifying specific timings or sequences for each identified specific task-related step-by-step interaction, actuation, movement, transfer, or placement of the identified particular one or more objects for accomplishing the one of performing processes in the histology laboratory or performing processes in the pathologist's office;
wherein, where the particular one or more objects include instrumentation or equipment, the plurality of steps further comprises:
    identifying a model of the instrumentation or equipment for performing at least a portion of the one of performing processes in the histology laboratory, or performing processes in the pathologist's office; and
    accessing documentation of the identified model of the instrumentation or equipment in response to user selection of operation of the instrumentation or equipment;
wherein identifying specific task-related step-by-step interactions, actuations, movements, transfers, or placements of the identified particular one or more objects comprises identifying specific task-related step-by-step interactions, actuations, movements, transfers, or placements of the identified model of the instrumentation or equipment based on information in the accessed documentation and based on the user selection of operation of the instrumentation or equipment for performing the at least the portion of the one of performing processes in the histology laboratory or performing processes in the pathologist's office; and
wherein the generated first image overlay comprises one or more image overlays of data corresponding to at least
    the identified particular one or more objects,
    the identified specific task-related step-by-step interactions, actuations, movements, transfers, or placements of the identified particular one or more objects, and
    the identified specific timings or sequences for each identified specific task-related step-by-step interaction, actuation, movement, transfer, or placement of the identified particular one or more objects for accomplishing the one of performing processes in the histology laboratory or performing processes in the pathologist's office.

\* \* \* \* \*